(12) United States Patent
Fukumura et al.

(10) Patent No.: US 11,860,003 B2
(45) Date of Patent: *Jan. 2, 2024

(54) POSITION ESTIMATION METHOD AND POSITION CONTROL DEVICE

(71) Applicant: Nidec Corporation, Kyoto (JP)

(72) Inventors: Tomohiro Fukumura, Kyoto (JP); Atsushi Fujita, Kyoto (JP); Shota Ishigami, Kyoto (JP)

(73) Assignee: NIDEC CORPORATION, Kyoto (JP)

( * ) Notice: Subject to any disclaimer, the term of this patent is extended or adjusted under 35 U.S.C. 154(b) by 338 days.

This patent is subject to a terminal disclaimer.

(21) Appl. No.: 17/186,058

(22) Filed: Feb. 26, 2021

(65) Prior Publication Data

US 2021/0180990 A1 Jun. 17, 2021

Related U.S. Application Data

(63) Continuation of application No. 15/537,893, filed as application No. PCT/JP2015/085559 on Dec. 18, 2015, now Pat. No. 10,976,182.

(30) Foreign Application Priority Data

Dec. 22, 2014 (JP) .................................. 2014-259502

(51) Int. Cl.
*G01D 5/14* (2006.01)
*H02P 6/16* (2016.01)
*H02K 11/215* (2016.01)

(52) U.S. Cl.
CPC ........... *G01D 5/145* (2013.01); *H02K 11/215* (2016.01); *H02P 6/16* (2013.01)

(58) Field of Classification Search
CPC .................................................. G01D 5/145
See application file for complete search history.

(56) References Cited

U.S. PATENT DOCUMENTS 8,872,453 B2 10/2014 Kamatani et al.
10,976,182 B2 * 4/2021 Fukumura .............. G01D 5/145
(Continued)

FOREIGN PATENT DOCUMENTS

CN 101330269 A 12/2008
DE 24 03 432 B2 11/1975
(Continued)

OTHER PUBLICATIONS

Fukumura et al., "Position Estimation Method and Position Control Device", U.S. Appl. No. 15/537,893, filed Jun. 20, 2017.
(Continued)

*Primary Examiner* — Reena Aurora
(74) *Attorney, Agent, or Firm* — Keating & Bennett, LLP

(57) ABSTRACT

A method of position estimation including: a signal detection step in which N (where N is an integer of 3 or more) sensors each detect a magnetic field which is in accordance with a position of a mover and output a detection signal as an electrical signal, the detection signals being displaced in phase by an angle obtained by dividing 360 degrees by N; a crossing detection step in which a crossing detection section sequentially detects a crossing at which each detection signal having been output through the signal detection step crosses another; a subdivision detection step in which a subdivision detection section detects a portion of the detection signal that connects from a crossing to another crossing which is adjacent to that crossing, as one or more subdivision signals; and a line segment joining step in which a line segment joining section sequentially joins the subdivision signals and estimates the position of the mover based on the plural subdivision signals having been joined, to generate an estimated position value signal.

10 Claims, 26 Drawing Sheets

(56) References Cited

U.S. PATENT DOCUMENTS

| | | | |
|---|---|---|---|
| 2004/0164733 A1 | 8/2004 | Fukaya et al. | |
| 2010/0026282 A1* | 2/2010 | Kaita | G01B 7/30 |
| | | | 324/207.25 |
| 2010/0109655 A1 | 5/2010 | Tanaka et al. | |
| 2010/0194319 A1 | 8/2010 | Ito et al. | |
| 2011/0266990 A1 | 11/2011 | Murata et al. | |
| 2011/0291601 A1 | 12/2011 | Ito et al. | |
| 2012/0280641 A1 | 11/2012 | Lejeune et al. | |
| 2013/0106326 A1 | 5/2013 | Kamatani et al. | |
| 2014/0039829 A1 | 2/2014 | Kubota et al. | |
| 2020/0232822 A1* | 7/2020 | Weiland | G01P 3/487 |

FOREIGN PATENT DOCUMENTS

| | | |
|---|---|---|
| EP | 0 971 202 A2 | 1/2000 |
| EP | 1 796 257 A1 | 6/2007 |
| EP | 2 233 891 A2 | 9/2010 |
| EP | 2 242 173 A1 | 10/2010 |
| JP | 55-109398 U | 7/1980 |
| JP | 02-197289 A | 8/1990 |
| JP | 03-261869 A | 11/1991 |
| JP | 09-047071 A | 2/1997 |
| JP | 09-121584 A | 5/1997 |
| JP | 2001-136776 A | 5/2001 |
| JP | 2002-186237 A | 6/2002 |
| JP | 2004-271495 A | 9/2004 |
| JP | 2005-295721 A | 10/2005 |
| JP | 2008-206323 A | 9/2008 |
| JP | 2009-055649 A | 3/2009 |
| JP | 2012-213308 A | 11/2012 |
| JP | 2013-099023 A | 5/2013 |
| JP | 2013-149123 A | 8/2013 |
| JP | 2014-032154 A | 2/2014 |
| JP | 2015-171222 A | 9/2015 |
| RU | 2 408 127 C1 | 12/2010 |
| RU | 2 431 916 C1 | 10/2011 |
| RU | 2 470 453 C1 | 12/2012 |
| WO | 2008/050550 A1 | 5/2008 |
| WO | 2015/133203 A1 | 9/2015 |

OTHER PUBLICATIONS

Fukumura et al., "Position Estimation Method and Position Control Device", U.S. Appl. No. 17/186,056, filed Feb. 26, 2021.

* cited by examiner

POSITION ESTIMATION METHOD AND POSITION CONTROL DEVICE

TECHNICAL FIELD

The present application relates to a method of position estimation and a position control device.

BACKGROUND ART

Position detection devices which detect the rotary position of a rotor in a motor with magnetic sensors have been proposed before. For example, Patent Document 1 describes controlling the rotary position of a motor by using detection signals which are obtained from a photosensor and an encoder disk attached to the motor.

CITATION LIST

Patent Literature

[Patent Document 1] Japanese Laid-Open Patent Publication No. 2012-213308

SUMMARY OF INVENTION

Technical Problem

In the technique described in Patent Document 1, a detection signal to be read by the encoder is susceptible to influences of the environment, e.g., dust particles. Moreover, the motor will increase in size in order to accommodate the encoder.

According to the present disclosure, embodiments of methods of position estimation and position control devices are provided, such that detection signals with which to detect the position of a mover are not susceptible to influences of the environment, thereby providing an improved precision of position detection.

Solution to Problem

In one implementation of a method of position estimation according to the present invention, in a signal detection step, N (where N is an integer of 3 or more) sensors each detect a magnetic field which is in accordance with a position of a mover and output an electrical signal. The detection signals are displaced in phase by an angle obtained by dividing 360 degrees by N. Next, in a crossing detection step, a crossing detection section sequentially detects a crossing at which each detection signal having been output through the signal detection step crosses another. Next, in a subdivision detection step, a subdivision detection section detects a portion of the detection signal that connects from the crossing to another crossing which is adjacent to that crossing, as one or more subdivision signals. Next, in a line segment joining step, a line segment joining section sequentially joins the subdivision signals and estimates the position of the mover based on the plural subdivision signals having been joined, to generate an estimated position value signal.

One implementation of a position estimation device according to the present invention is a position estimation device that estimates a position of a mover having a plurality of magnetic poles, the position estimation device comprising: N (where N is an integer of 3 or more) sensors to detect magnetic fields created by the plurality of magnetic poles, the N sensors each outputting a detection signal having a magnitude which is in accordance with an intensity of a detected magnetic field, and the N sensors being disposed so that the N detection signals are displaced in phase by an angle which is 360 degrees/N; a preprocessing circuit to generate N corrected detection signals from the N detection signals; a signal processing circuit to generate and output a signal indicating an estimated position value of the mover based on the N corrected detection signals; and a storage medium being connected to the signal processing circuit and having stored thereon a computer program to control an operation of the signal processing circuit. In accordance with instructions in the computer program, the signal processing circuit performs: sequentially detecting a crossing at which two signals among the N corrected detection signals cross each other; subdividing a corrected detection signal that links from a crossing to another crossing which is adjacent to that crossing into one or more segments, and detecting each segment as a subdivision signal; reading, from a storage device, measurement data in which a moved amount of the mover corresponding to each segment is associated with every segment; by referring to the measurement data, identifying a segment that corresponds to a current position of the mover, based on a relationship among the N corrected detection signals and on the subdivision signals; and based on the identified segment, determining an estimated position value of the mover from levels of the subdivision signals, and outputting a signal indicating the estimated position value.

Another implementation of a position estimation device according to the present invention is a position estimation device that estimates a position of a mover having a plurality of magnetic poles, the position estimation device comprising: N (where N is an integer of 3 or more) sensors to detect magnetic fields created by the plurality of magnetic poles, the N sensors each outputting a detection signal having a magnitude which is in accordance with an intensity of a detected magnetic field, and the N sensors being disposed so that the N detection signals are displaced in phase by an angle which is 360 degrees/N; a preprocessing circuit to generate N corrected detection signals from the N detection signals; a signal processing circuit to generate and output a signal indicating an estimated position value of the mover based on the N corrected detection signals; and a storage medium being connected to the signal processing circuit and having stored thereon a computer program to control an operation of the signal processing circuit. In accordance with instructions in the computer program, the signal processing circuit performs: sequentially detecting a crossing at which two signals among the N corrected detection signals cross each other, subdividing a corrected detection signal that links from a crossing to another crossing which is adjacent to that crossing into one or more segments, and detecting each segment as a subdivision signal; sequentially joining the subdivision signals, and based on the plural subdivision signals having been joined, determining an estimated position value of the mover from levels of the subdivision signals, and outputting a signal indicating the estimated position value.

One implementation of a position controlling system according to the present invention is a position controlling system that controls a position of the mover, the position control device comprising: any of the above position estimation devices; a driving circuit to drive the mover; and a control circuit connected to the driving circuit to supply a command voltage value to the driving circuit, the control circuit determining the command voltage value based on a signal indicating an estimated position value of the mover as acquired from the position estimation device and on a command position value which is input from an external device.

Advantageous Effects of Invention

According to an embodiment of the present invention, a detection signal from a detection section that detects the position of a mover is not susceptible to influences of the environment, e.g., dust particles.

DESCRIPTION OF EMBODIMENTS

Hereinafter, with reference to the drawings as necessary, embodiments of the present disclosure will be described in detail. Note however that unnecessarily detailed descriptions may be omitted. For example, detailed descriptions on what is well known in the art or redundant descriptions on what is substantially the same constitution may be omitted. This is to avoid lengthy description, and facilitate the understanding of those skilled in the art. The accompanying drawings and the following description, which are provided by the inventors so that those skilled in the art can sufficiently understand the present disclosure, are not intended to limit the scope of claims.

First Embodiment

Figure 1:
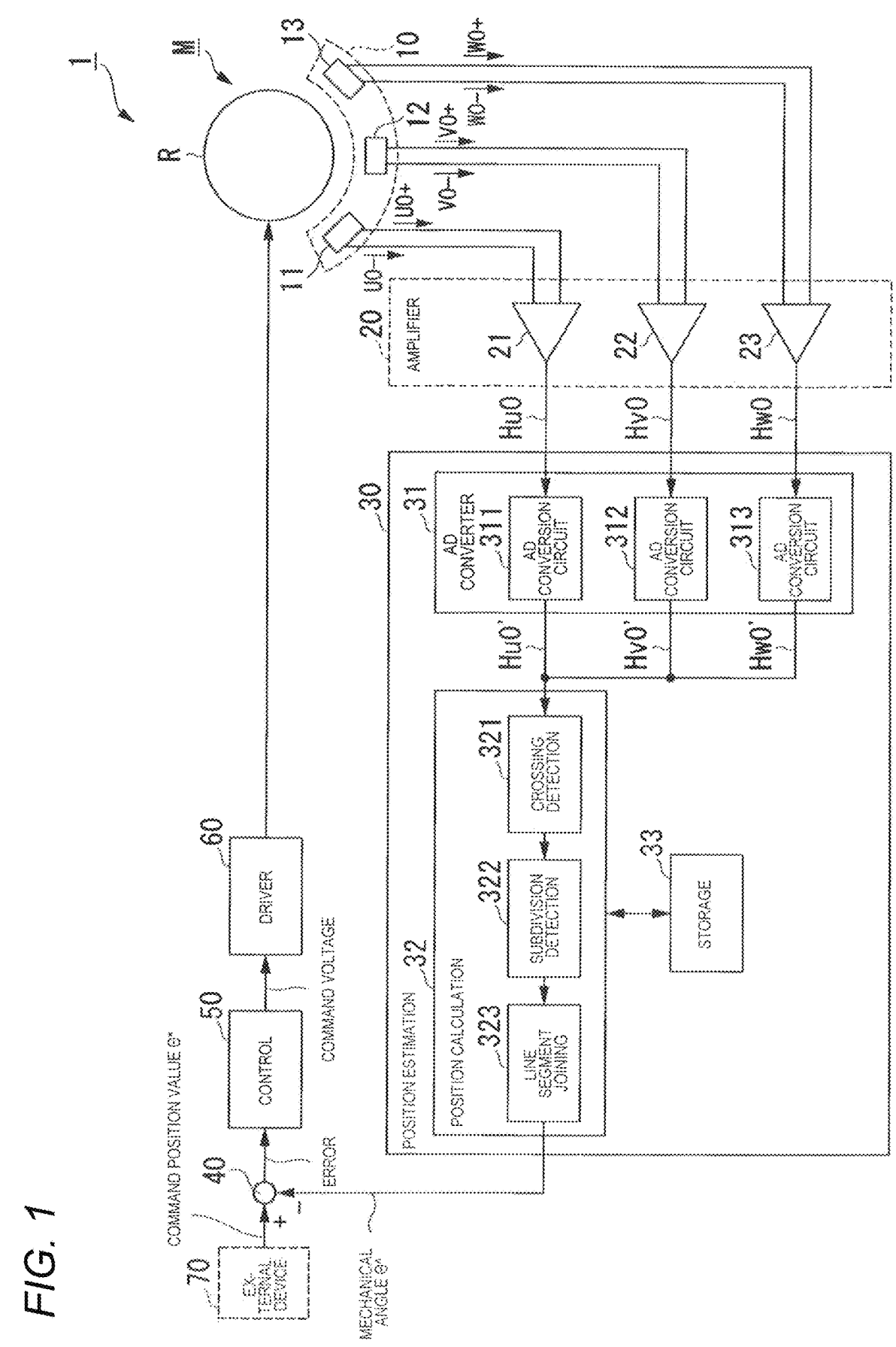
FIG. 1 A schematic diagram showing the construction of a position detection apparatus according to a first embodiment.

FIG. 1 is a schematic diagram showing an exemplary construction of a motor controlling system 1 according to the present embodiment.

As shown in FIG. 1, the motor controlling system 1 of the present embodiment includes a motor M, a detection section 10, an amplification section 20, a position estimation section 30, a subtracter 40, a control section (control circuit) 50, and a driving section (driving circuit) 60. From an external device 70, a command position value $\Theta^*$ is input to the motor controlling system 1. The superscript* indicates a command value. The superscript^ indicates an estimated value. In an embodiment of the present invention, CW rotation means clockwise rotation as viewed from the output shaft.

The motor controlling system 1 is to be used in a form as mounted in a product. The product may be, for example: a multifunction product (MFP) having printer, scanner, facsimile, and other functions; electric power steering; an antenna tilter; a fan; or the like. When used in a multifunction product, the motor controlling system 1 may be used as mounted in mechanisms such as the paper feed section, for example.

Although a case where the motor M includes a rotor R will be described as an example below, this is not a limitation. The motor M may be a linear motor. In the case where the motor M is a linear motor, the motor M includes a mover (or movable element) that undergoes a linear motion, instead of a rotor R. In other words, an embodiment of the present invention may control a mover (rotor) which undergoes rotational motion, or control a mover which undergoes linear motion. Therefore, it may be any mover, irrespective of rotational motion or linear motion. In the present application, the term "mover" means a driven element which undergoes rotation or movement under an external force.

The motor M includes a rotor R. The motor M may be a permanent magnet motor, for example. A substrate which is not shown is attached to the motor M. The substrate has mounted thereon a detection section 10, an amplification section 20, a position estimation section 30, a subtracter 40, a control section 50, and a driving section 60.

The detection section 10 includes sensors 11 to 13. Each of the sensors 11 to 13 is a non-contact magnetic sensor which converts a magnetic field generated in the motor M into electrical signals for output. Each of the sensors 11 to 13 may be a Hall generator, for example. To the amplification section 20, the detection section 10 outputs the differential sensor signals which have been detected. The operation of the motor controlling system 1 according to the present embodiment includes a signal detection step. In the signal detection step, each of N (where N is an integer of 3 or more) detection sections detects a magnetic field which is in accordance with the position of the mover, and outputs a detection signal as an electrical signal, these detection signals being displaced in phase by an angle obtained by dividing 360 degrees by N. When there is a number N (where N is an integer of 3 or more) of such sensors, magnetic fields that are created by a plurality of magnetic poles are detected, and detection signals each having a magnitude which is in accordance with the intensity of a detected magnetic field are output. The N sensors are disposed so that the N detection signals are displaced in phase by an angle of 360 degrees/N. The detection signals being displaced in phase by an angle of 360 degrees/N encompasses these being displaced in phase by an electrical angle which is 360 degrees×integer±360 degrees/N. The detection signals being displaced in phase by an angle of e.g. 120 degrees (=360 degrees/3) encompasses three detection signals being displaced in phase by an electrical angle of 240 degrees (=360 degrees−120 degrees).

The amplification section 20 includes differential amplifiers 21 to 23. Based on differential sensor signals which are input from the detection section 10, the amplification section 20 generates a detection signal Hu0, a detection signal Hv0, and a detection signal Hw0. The amplification section 20 outputs the generated detection signal Hu0, detection signal Hv0, and detection signal Hw0 to the position estimation section 30. Note that the detection signal Hu0, detection signal Hv0, and detection signal Hw0 are analog signals.

Based on the detection signal Hu0, detection signal Hv0, and detection signal Hw0 which have been input from the amplification section 20, the position estimation section 30 estimates a rotary position of the rotor R. Based on the estimated rotary position, the position estimation section 30 generates a mechanical angle $\hat{\Theta}$, and outputs the generated mechanical angle $\hat{\Theta}$ to the subtracter 40.

The subtracter 40 receives the mechanical angle $\hat{\Theta}$ being input from the position estimation section 30, and the command position value $\Theta^*$ being input from the external device 70. The subtracter 40 calculates a deviation between the command position value $\Theta^*$ and the mechanical angle $\hat{\Theta}$, and outputs the calculated deviation to the control section 50.

Based on the deviation having been input from the subtracter 40, the control section 50 generates a command voltage for driving the motor M, and outputs the generated command voltage to the driving section 60.

Based on the command voltage having been input from the control section 50, the driving section 60 generates a driving signal, and drives the motor M with the generated driving signal. A typical example of the driving section 60 is an inverter circuit. An inverter circuit may include: a PWM circuit which outputs a pulse width modulation (PWM) signal in response to a command voltage; a pre-driver circuit which outputs a gate driving signal based on the PWM signal; and an inverter output circuit which performs switching in response to the gate driving signal.

The control section 50 and a part of the driving section 60 (e.g., a PWM circuit) may be implemented as a single integrated circuit package. Such an integrated circuit package would be available as a general-purpose motor control microcomputer. An inverter output circuit in the driving circuit 60 may also be called a power module. Such an inverter output circuit is able to apply a voltage of a magnitude which is in accordance with the command voltage to each coil of the motor M, thus driving the motor M.

Thus, the motor controlling system 1 exerts control by receiving the command position value $\Theta^*$ from the external device 70 and feeding back a deviation or error between the command position value $\Theta^*$ and the mechanical angle $\hat{\Theta}$. Herein, the motor controlling system 1 sequentially detects crossings at which the detection signals Hu0, Hv0 and Hw0 cross each other, and detects, as a subdivision signal, a portion (subdivided line segment) of the detection signal Hu0, Hv0 or Hw0 from a detected crossing to another crossing which is adjacent to that crossing (see FIG. 6A).

Figure 6A:
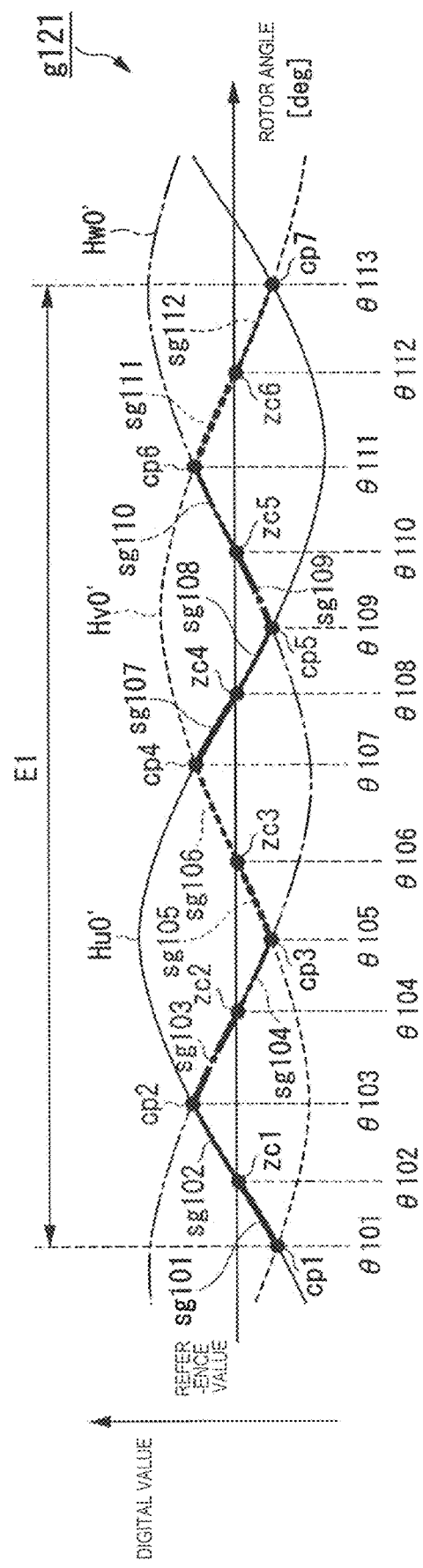
FIG. 6A A diagram describing relative magnitudes, crossings, zero-crossings, and subdivision signal associated with three detection signals Hu0', Hv0' and Hw0' according to the first embodiment.

Among the three detection signals Hu0, Hv0 and Hw0, which are displaced in phase by 120 degrees, any portion that connects or links from a crossing to another crossing which is adjacent to that crossing is a portion of one signal Hu0, Hv0 or Hw0 that has an intermediate level among the detection signals Hu0, Hv0 and Hw0. As shown in FIG. 6A, a portion that connects from a crossing to another crossing which is adjacent to that crossing crosses a reference level. Stated otherwise, a portion that connects from a crossing to another crossing which is adjacent to that crossing has a portion that is larger than the reference value and a portion that is smaller than the reference value. As will be described later, a portion that connects from a crossing to another crossing which is adjacent to that crossing may be processed as a single "subdivision signal", or processed as two "subdivision signals". In the latter case, a portion that connects from a crossing to another crossing which is adjacent to that crossing is divided into two portions by a point of zero-crossing with the reference value. A portion that connects from a crossing to another crossing which is adjacent to that crossing may be divided into three or more "subdivision signals".

Figure 6B:
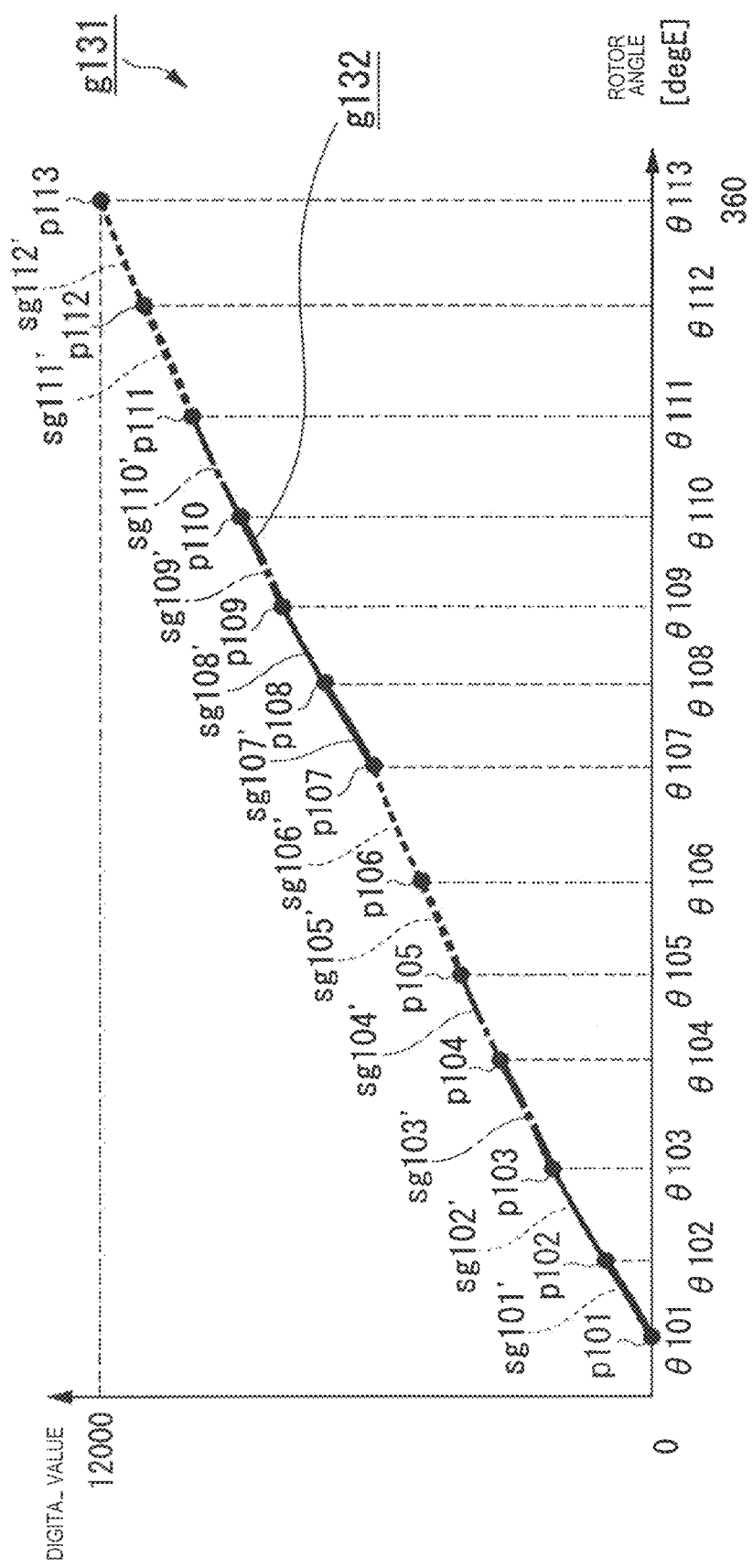
FIG. 6B A diagram describing joining of subdivision signals which are worth one cycle of electrical angle according to the first embodiment.
Figure 7:
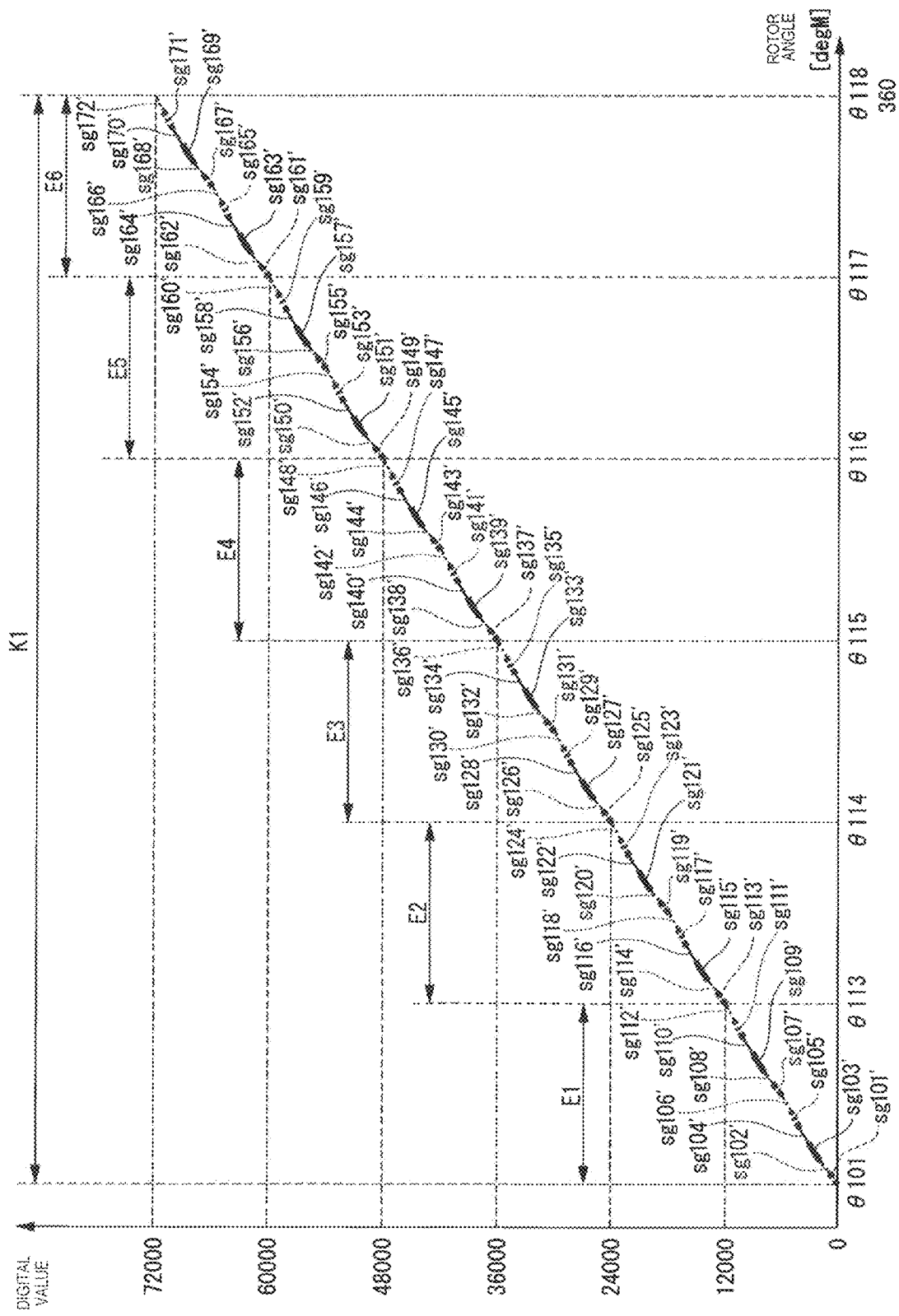
FIG. 7 A diagram describing joining of subdivision signals which are worth one cycle of mechanical angle, according to the first embodiment.

In accordance with the direction in which the mover is moving, the motor controlling system 1 sequentially joins the detected subdivision signals, and estimates a position of the mover based on the plural subdivision signals having been joined, thus generating an estimated position value signal (see FIG. 6B, FIG. 7). Note that the estimated position value can be used as a feedback value by a system of electric current control, a system of velocity control, a system of position control, or any system of control which is a combination thereof. The position calculating section 32 and the control section 50 function as a "position control device".

Next, a schematic construction of the motor M will be described.

Figure 2:
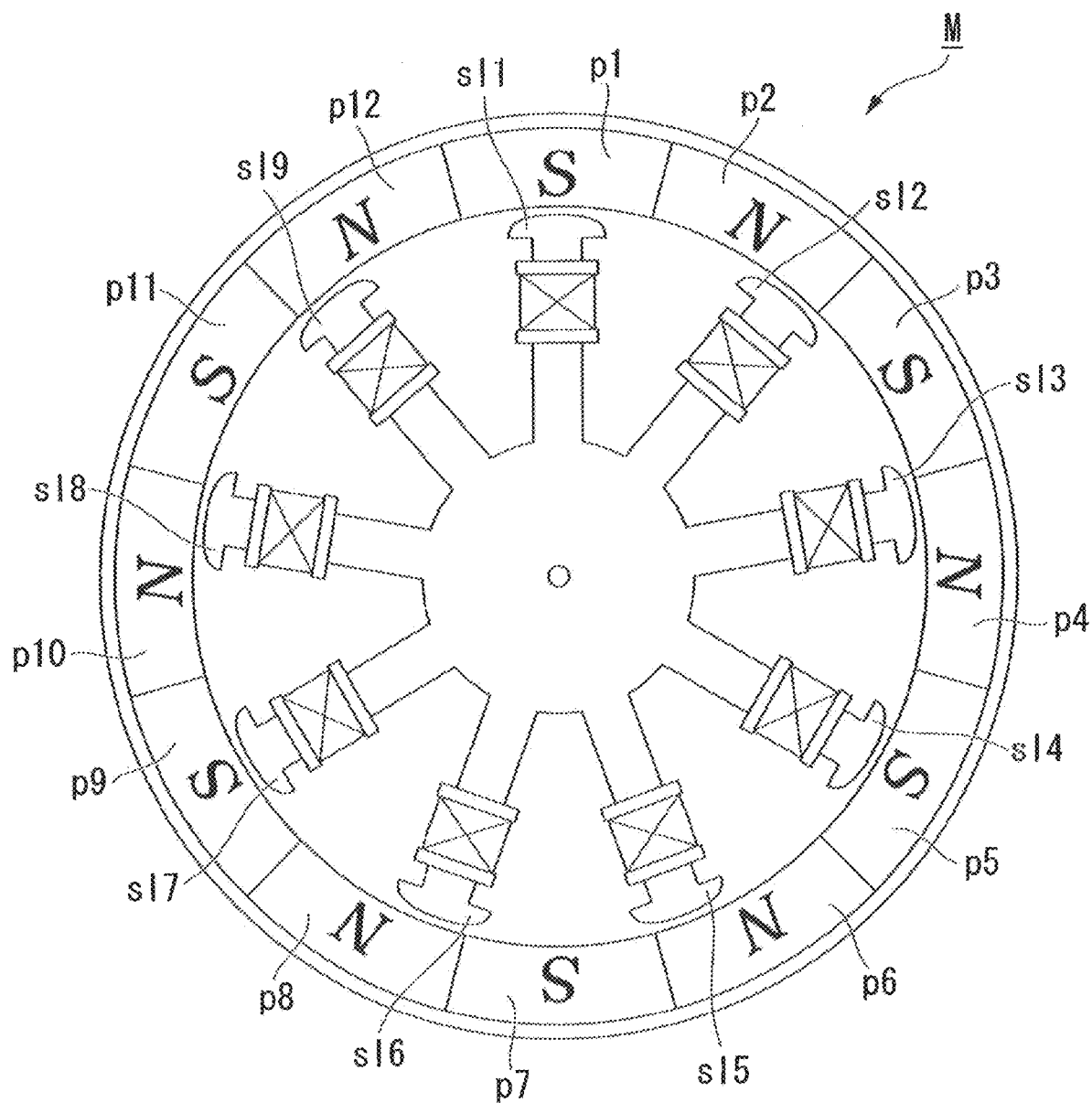
FIG. 2 A diagram showing the schematic construction of a motor according to the first embodiment.

FIG. 2 is a diagram showing the schematic construction of the motor M according to the present embodiment.

In the example shown in FIG. 2, the motor M is a permanent magnet motor. Magnetic poles p1 to p12 are the magnetic poles of the permanent magnet motor. The number of poles, which is indicative of the number of magnetic poles in the motor M, is 12 in the example shown in FIG. 2. The number of pole pairs, which is indicative of the number of pairs consisting of an N pole and an S pole, is 6 in the example shown in FIG. 2. Slots s11 to s19 are armatures around each of which a coil is wound. The number of slots, which is indicative of how many slots (teeth) there are, is 9. For example, the magnetic poles p1 to p12 may be portions of the rotor R (see FIG. 1). The motor M in FIG. 2 represents a motor of an outer rotor type.

Next, the operation of the sensors 11 to 13 will be described.

Each of the sensors 11 to 13 detects a magnetic field that is based on an adjoining pair of an N pole and an S pole, and outputs a signal which is worth one cycle. This corresponds to one cycle of electrical angle. In the form of differential sensor signals, each of the sensors 11 to 13 outputs the detected electrical signal, which is worth one cycle of electrical angle, to the amplification section 20. These differential sensor signals, which are worth one cycle, correspond to one cycle of electrical angle.

Now, the sensors 11 to 13 respectively detect electrical signals which are displaced in phase by 120 degrees of electrical angle, and output them to the corresponding differential amplifiers 21 to 23. In other words, there are three sensors included in the detection section 10, such that the three detection signals are displaced in phase by 120 degrees. In one specific example, the sensors 11 to 13 detect electrical signals which are displaced in phase by 40 degrees of mechanical angle (240 degrees of electrical angle).

In the present embodiment, an electrical signal which is detected by the sensor 11 is designated as U-phase. An electrical signal which is detected by the sensor 12 is designated as V-phase. An electrical signal which is detected by the sensor 13 is designated as W-phase. The differential sensor signals which are output from the sensor 11 are differential sensor signals U0+ and U0− are inverse of each other. The differential sensor signals which are output from the sensor 12 are differential sensor signals V0+ and V0− are inverse of each other. The differential sensor signals which are output from the sensor 13 are detection signals W0+ and W0− are inverse of each other.

Next, the detection signals to be output from the amplification section 20 will be described with reference to FIG. 1.

The differential amplifier 21 amplifies a voltage difference between the U-phase detection signals U0− and U0+ which are input from the sensor 11, and outputs an amplified detection signal Hu0 to the position estimation section 30.

The differential amplifier 22 amplifies a voltage difference between the V-phase detection signals V0− and V0+ which are input from the sensor 12, and outputs an amplified detection signal Hv0 to the position estimation section 30.

The differential amplifier 23 amplifies a voltage difference between the W-phase detection signals W0− and W0+ which are input from the sensor 13, and outputs an amplified detection signal Hw0 to the position estimation section 30.

Figure 3:
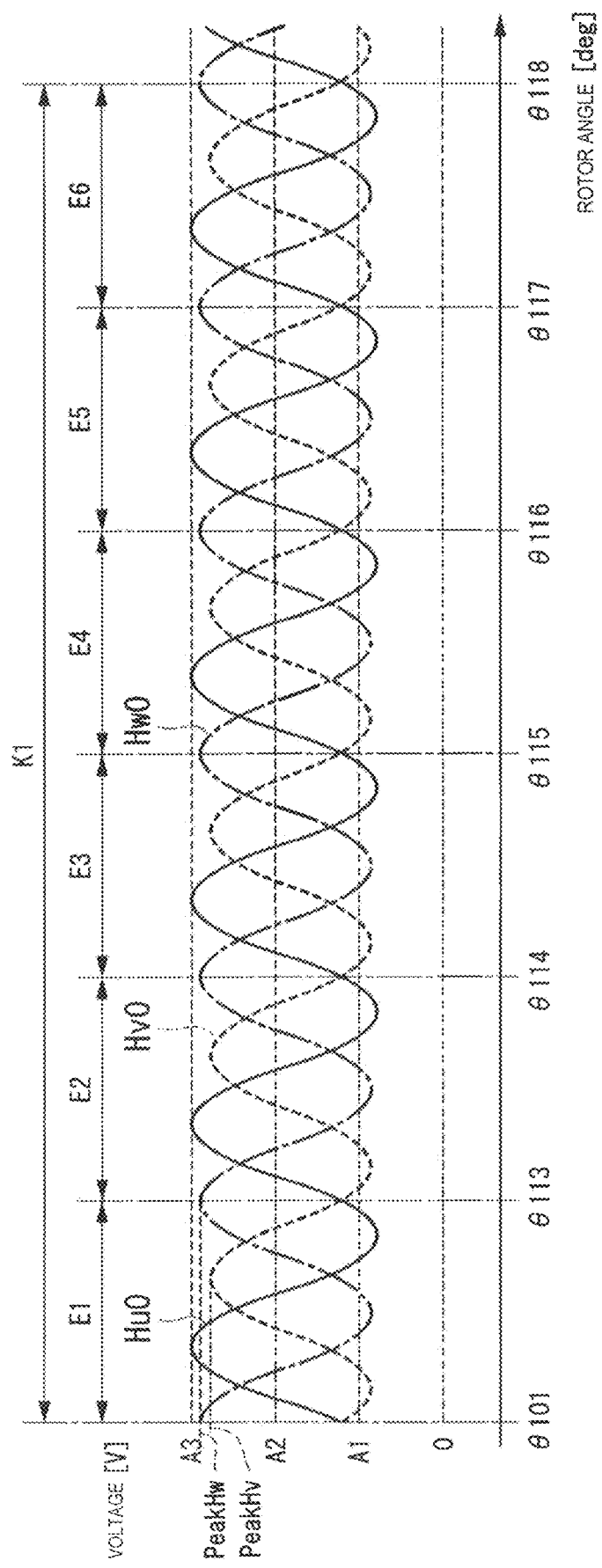
FIG. 3 A diagram showing examples of detection signals Hu0, Hv0 and Hw0 which are output from an amplification section according to the first embodiment.

Next, examples of detection signals Hu0, Hv0 and Hw0 which are output from the amplification section 20 will be described. FIG. 3 is a diagram showing examples of detection signals Hu0, Hv0 and Hw0 which are output from the amplification section 20 according to the present embodiment. In FIG. 3, the horizontal axis represents the rotor angle [deg]. The vertical axis represents the signal magnitude.

In the example shown in FIG. 3, a period E1 from rotor angles θ101 through θ113 represents one cycle of electrical angle. A period E2 from rotor angles θ113 through θ114, a period E3 from rotor angles θ114 through θ115, a period E4 from rotor angles θ115 through θ116, a period E5 from rotor angle θ116 through θ117, and a period E6 from rotor angles θ117 through θ118 each represent one cycle of electrical angle. A period Kl which spans periods E1 through E6 represents one cycle of mechanical angle. In other words, a period which is equivalent to one cycle of electrical angle is a period determined by dividing a period which is equivalent to one cycle of mechanical angle by the number of pole pairs.

In the example shown in FIG. 3, the detection signal Hu0 takes local maximums A3 [V]. The detection signal Hw0 takes local maximums PeakHw [V], which are smaller than the voltage value of A3. The detection signal Hv0 takes local maximums PeakHv [V], which are smaller than the voltage value of PeakHw. Thus, owing to errors when mounting the sensors 11 to 13, and the differing sensitivity from sensor to sensor, there are amplitude variations among the detection signals Hu0, Hv0 and Hw0. Moreover, the signals Hu0, Hv0 and Hw0 have respectively different central voltage values. In other words, the signals Hu0, Hv0 and Hw0 each have an offset component.

Next, a detailed construction of the position estimation section 30 will be described with reference to FIG. 1.

The position estimation section 30 includes an AD conversion section 31, a position calculating section 32, and a storage section 33. The AD conversion section 31 converts the detection signals having been input from the amplification section 20, which are analog signals, into detection signals that are digital signals, and outputs the digital detection signals resulting from conversion to the position calculating section 32. More specifically, it includes an AD conversion circuit 311, an AD conversion circuit 312, and an AD conversion circuit 313. The AD conversion circuit 311 converts the detection signal Hu0, which is an analog signal, into a detection signal Hu0', which is a digital signal, for output to the position calculating section 32. The AD conversion circuit 312 converts the detection signal Hv0, which is an analog signal, into a detection signal Hv0', which is a digital signal, for output to the position calculating section 32. The AD conversion circuit 313 converts the detection signal Hw0, which is an analog signal, into a detection signal Hw0', which is a digital signal, for output to the position calculating section 32. The storage section 33 stores information to be utilized in online processing. Online processing is a process to be performed in real time while the rotor R is rotating. The information to be stored in the storage section 33 will be described later.

As described above, the conversion of a detection signal into a signal which is suitable for processing in the position calculating section 32 may be called "preprocessing". The AD conversion section 31 is an example of a circuit that performs preprocessing. The position calculating section 32 may also include circuits that perform any other preprocessing.

For the detection signals Hu0', Hv0' and Hw0', which are digital signals resulting from conversion by the AD conversion section 31, the horizontal axis represents the rotor angle [deg]; and the vertical axis represents the magnitude of the digital value. The position calculating section 32 includes a crossing detection section 321, a subdivision detection section 322, and a line segment joining section 323. The crossing detection section 321 detects a crossing between detection signals, and also a zero-crossing between a detection signal and a reference value. In other words, between a crossing and another crossing which is adjacent to that crossing, the crossing detection section 321 sequentially detects each zero-crossing at which the potential of the detection signal crosses the reference voltage. The reference value is a value corresponding to a digital value of 0. The crossing detection section 321 outputs information representing the coordinates of detected crossings and information representing the coordinates of zero-crossings to the subdivision detection section 322. As used herein, the information representing the coordinates of crossings and zero-crossings is information that is expressed in terms of rotor angles and magnitudes of digital values. By using the information representing the coordinates of a crossing and the information representing the coordinates of a zero-crossing which are input from the crossing detection section 321, the subdivision detection section 322 detects any detection signal between the crossing and the zero-crossing, as a subdivision signal. The subdivision detection section 322 outputs information representing the detected subdivision signals to the line segment joining section 323. By using the information representing the subdivision signals which is input from the subdivision detection section 322, the line segment joining section 323 sequentially joins the subdivision signals. Herein, the information representing a subdivision signal is information which is expressed by the rotor angle and the magnitude of the digital value, from the start position to the end position of the subdivision signal constituting a part of the detection signal.

As described above, the operation by the motor controlling system 1 according to the present embodiment includes a crossing detection step, a subdivision detection step, and a line segment joining step. In the crossing detection step, the crossing detection section 321 sequentially detects a crossing at which each detection signal having been output through the signal detection step crosses another. In the subdivision detection step, the subdivision detection section 322 detects a portion of the detection signal that connects from the crossing to another crossing which is adjacent to that crossing, as one or more subdivision signals. In the line segment joining step, the line segment joining section 323 sequentially joins the subdivision signals and estimates the position of the mover based on the plural subdivision signals having been joined, to generate an estimated position value signal.

Next, after describing a flow of processes that are performed by the position estimation section 30 in outline, the flow of processes that are performed by the position estimation section 30 will be described in detail.

Figure 4:
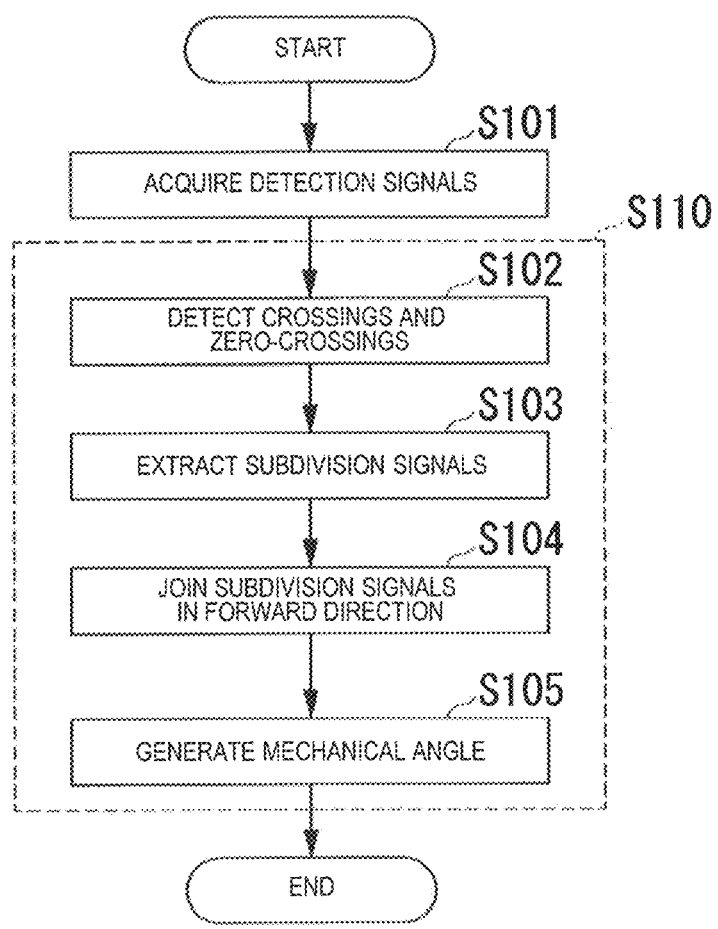
FIG. 4 A flowchart showing a procedure of processing performed by a position estimation section according to the first embodiment.

First, with reference to FIG. 4, the flow of processes that are performed by the position estimation section 30 will be described in outline. FIG. 4 is a flowchart showing a procedure of processing performed by the position estimation section 30 according to the present embodiment. Note that the position estimation section 30 performs the following processes through online processing.

(step S101) The crossing detection section 321 acquires the detection signals Hu0', Hv0' and Hw0' having been input from the AD conversion section 31.

(step S102) By using the values respectively exhibited by the detection signals Hu0', Hv0' and Hw0' acquired at step S101, the crossing detection section 321 sequentially detects crossings and zero-crossings. Next, the crossing detection section 321 consecutively outputs information representing the coordinates of the detected crossings and zero-crossings, and the input detection signals Hu0', Hv0' and Hw0', to the subdivision detection section 322.

(step S103) The subdivision detection section 322 detects a portion of a detection signal from a crossing to a zero-crossing which is adjacent to that crossing, i.e., a partial detection signal from a crossing to a zero-crossing which is adjacent to that crossing, as a first subdivision signal. Alternatively, the subdivision detection section 322 detects a portion of a detection signal from a zero-crossing to a crossing which is adjacent to that zero-crossing, i.e., a partial detection signal from a zero-crossing to a crossing which is adjacent to that zero-crossing, as a second subdivision signal.

(step S104) If the rotor R is undergoing CW rotation, the line segment joining section 323 sequentially joins, in the forward direction, the subdivision signals having been input from the subdivision detection section 322 over the course of one cycle of mechanical angle.

(step S105) The position estimation section 30 estimates a mechanical position based on the subdivision signals having been joined by the line segment joining section 323, thus estimating a mechanical angle $\hat{\Theta}$.

The position estimation section 30 repeats the processes of steps S101 through S105 for every control cycle. A control cycle may be, for example, any one of the respective control cycles of current (torque), velocity, or position control. In the following description, the processes of steps S102 through S105 in FIG. 4 may be collectively referred to as the process of step S110.

Next, details of the flow of processes performed by the position estimation section 30 will be described. First, with reference to FIG. 4, the process which is performed by the crossing detection section 321 at step S101 will be described.

While the rotor R is rotating, the crossing detection section 321 acquires detection signals Hu0', Hv0' and Hw0' which are respectively input from AD conversion circuits 311 to 313. The detection signal Hu0', detection signal Hv0', and detection signal Hw0' which are output from the AD conversion section 31 will be described with reference to FIG. 5.

Figure 5:
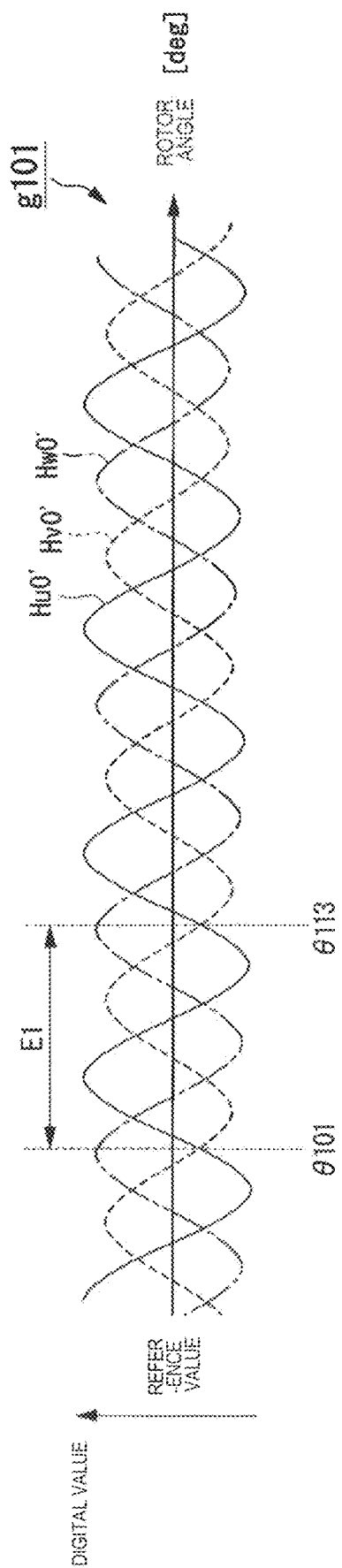
FIG. 5 A diagram describing examples of detection signals Hu0', Hv0' and Hw0' which are output by an AD conversion section according to the first embodiment.

FIG. 5 is a diagram describing examples of detection signals Hu0', Hv0' and Hw0' which are output by the AD conversion section 31 according to the present embodiment. In FIG. 5, the horizontal axis represents the rotor angle [deg]. The vertical axis represents the digital value. The waveforms Hu0', Hv0' and Hw0' shown in FIG. 5 are waveform diagrams representing the detection signals having been converted into digital signals by the AD conversion circuits 311 to 313. For example, when the number of bits of the AD conversion section 31 is 12 bits, the range of digital signal values is +2047 to −2048. In FIG. 5, the period E1 of the rotor angles θ101 through θ113 is equivalent to one cycle of electrical angle.

With reference again to FIG. 4, the process of detecting crossings and zero-crossings which is performed by the crossing detection section 321 at step S102 will be described in detail.

The crossing detection section 321 acquires detection signals Hu0', Hv0' and Hw0' which are output from the AD conversion section 31. The crossing detection section 321 sequentially detects a crossing between acquired detection signals, this being calculated from the coordinates of two sampled points. Moreover, the crossing detection section 321 sequentially detects a zero-crossing between an acquired detection signal and a reference value. The coordinates of such a crossing or zero-crossing are given by a rotor angle on the horizontal axis and a digital value on the vertical axis. The crossing detection section 321 detects the coordinates of the crossings, and outputs information represent the detected coordinates of the crossings to the subdivision detection section 322. Moreover, the crossing detection section 321 detects the coordinates of the zero-crossings and outputs information representing the detected coordinates of the zero-crossings to the subdivision detection section 322. Moreover, the crossing detection section 321 outputs the acquired detection signals Hu0', Hv0' and Hw0' to the subdivision detection section 322.

Next, the subdivision signal detection process which is performed by the subdivision detection section 322 at step S103 in FIG. 4 will be described in detail.

The subdivision detection section 322 consecutively acquires the information representing the coordinates of the crossings, the information representing the coordinates of the zero-crossings, and the detection signals Hu0', Hv0' and Hw0', which have been input from the crossing detection section 321. Among the acquired detection signals, the subdivision detection section 322 detects any detection signal from a crossing to a zero-crossing which is adjacent to that crossing as a first subdivision signal. Among the acquired detection signals, the subdivision detection section 322 detects any detection signal from a zero-crossing to a crossing which is adjacent to that zero-crossing as a second subdivision signal. The subdivision detection section 322 consecutively outputs the detected subdivision signals to the line segment joining section 323. Herein, as information representing a first subdivision signal, the subdivision detection section 322 detects information of a deviation in digital value and a deviation in rotor angle from a crossing to a zero-crossing which is adjacent to that crossing.

Next, specific examples of crossings, zero-crossings, and subdivision signals will be described one after another.

First, specific examples of crossings and zero-crossings to be detected by the crossing detection section 321 will be described with reference to FIG. 6A.

FIG. 6A is a diagram describing relative magnitudes, crossings, zero-crossings, and subdivision signal associated with three detection signals Hu0', Hv0' and Hw0' according to the present embodiment. In FIG. 6A, the horizontal axis represents the rotor angle [deg]. The vertical axis represents the digital value. Moreover, FIG. 6A is a diagram showing enlarged the period E1 of the rotor angles θ101 through θ113 in FIG. 5.

In FIG. 6A, points cp1 through cp7 each denote a crossing. As used herein, a crossing is a point at which two detection signals cross each other. For example, the crossing cp1 in the rotor angle θ101 is a point at which the detection signal Hu0' and the detection signal Hv0' cross each other.

Moreover, points zc1 through zc6 denote a zero-crossing. As used herein, a zero-crossing is a point at which any of the detection signals Hu0', Hv0' and Hw0' crosses a reference value in digital value. For example, the zero-crossing zc1 in the rotor angle θ102 is a point at which the detection signal Hu0' crosses the reference value.

Next, specific examples of subdivision signals to be detected by the subdivision detection section 322 will be described with reference to FIG. 6A. In the following, a segment refers to each single subdivision signal. The period spanning a segment is from a start point to an end point of each subdivision signal. Segments come in 12 periods over the course of one cycle of electrical angle. When the number of pole pairs in the motor M is 6, six cycles of electrical angle corresponds to one cycle of mechanical angle; therefore, segments come in 72 periods over the course of one cycle of mechanical angle. A section refers to the ordinal number, from 1 to 12, of each subdivision signal over the course of one cycle of electrical angle. A subdivision signal is a detection signal from a crossing cp(n) to a zero-crossing zc(m) which is adjacent to that crossing cp(n) in FIG. 6A. Alternatively, it is a detection signal from a zero-crossing zc(m) to a crossing cp(n+1) which is adjacent to that zero-crossing zc(m). Note that n is an integer from 1 to 7, and m is an integer from 1 to 6. Specifically, for example, a portion of the detection signal Hu0' from the crossing cp1 to the zero-crossing zc1 is a subdivision signal sg101. A portion of the detection signal Hu0' from the zero-crossing zc1 to the crossing cp2 is a subdivision signal sg102. In FIG. 6A, the period from θ101 through θ102, i.e., the period of the subdivision signal sg101, corresponds to the period spanning segment number 1. The respective periods of the subdivision signals sg102 through sg112 correspond to periods spanning segment numbers 2 through 12.

In the example shown in FIG. 6A, the detection signals Hu0', Hv0' and Hw0' are sine waves; therefore, the subdivision signals sg101 through sg112 are signals spanning ranges, within the sine waves, that better resemble lines than does any other portion.

Now, the relative magnitudes of the three detection signals Hu0', Hv0' and Hw0' will be described with reference to FIG. 6A.

For example, in the period of the rotor angles θ101 through θ103, which is a period spanning Segment 1 and Segment 2, the digital value of the detection signal Hw0' is the largest among the three detection signals. It is the detection signal Hu0' that has the next largest digital value to the detection signal Hw0'. The detection signal Hv0' has the smallest digital value. Moreover, in the period of the rotor angles θ101 through θ102, which is a period spanning Segment 1, the digital value of the detection signal Hu0' is smaller than the reference value. In the period of the rotor angles θ102 through θ103, which is a period spanning Segment 2, the digital value of the detection signal Hu0' is larger than the reference value.

Also for Segments 3 through 12, relative magnitudes of the three detection signals Hu0', Hv0' and Hw0' are stored in the storage section 33, with respect to each segment.

Thus, over the course of one cycle of electrical angle, relative magnitudes of the three detection signals Hu0', Hv0' and Hw0' and their relative magnitudes with respect to the reference value in each segment are stored in the storage section 33.

Next, the process of joining subdivision signals which is performed by the line segment joining section 323 at step S104 in FIG. 4 will be described in detail.

The line segment joining section 323 sequentially joins subdivision signals from the subdivision detection section 322. Herein, the line segment joining section 323 joins the subdivision signals in the same positive or negative direction of the digital value, in accordance with the crossings or zero-crossings, the relative magnitudes of the detection signals Hu0', Hv0' and Hw0', and their relative magnitudes with respect to the reference value.

Specifically, for each segment, the line segment joining section 323 extracts a detection signal that ranks in the middle (which is also referred to as an intermediate signal) (e.g., the second largest (smallest) in the example of FIG. 6A) in terms of relative magnitudes of the digital values of the detection signals Hu0', Hv0' and Hw0'. The line segment joining section 323 makes a relative-magnitude comparison between each extracted intermediate signal in digital value and the detection signal at an immediately previous crossing or zero-crossing in digital value (which is also referred to as a crosspoint signal value). Herein, an immediately previous crossing or zero-crossing is supposed to be immediately previous to an intermediate signal in the rotor angle direction, as the crossing cp1 is to the subdivision signal sg101, or as the zero-crossing zc1 is to the subdivision signal sg102, in the example of e.g. FIG. 6A.

The subdivision signal sg102 will be discussed. If the digital value of the intermediate signal sg102 is determined as equal to or greater than the immediately previous crosspoint signal value zc1, then the line segment joining section 323 adds a value which is obtained by subtracting the immediately previous crosspoint signal value zc1 from the digital value of the intermediate signal sg102 to the immediately previous crosspoint signal value zc1. On the other hand, if the digital value of the intermediate signal sg102 is determined as smaller than the immediately previous crosspoint signal value zc1, then the line segment joining section 323 adds a value which is obtained by subtracting the digital value of the intermediate signal sg102 from the immediately previous crosspoint signal value zc1. The line segment joining section 323 repeats this addition in ascending order from the smaller rotor angles. As a result, the line segment joining section 323 is able to join subdivision signals in the positive direction of digital values (see FIG. 6B).

Note that, the line segment joining section 323 may add a difference, i.e., an absolute value, between the digital value of an intermediate signal and the immediately previous crosspoint signal value.

Since the motor M includes 6 pole pairs, the end point of the subdivision signal sg112' corresponds to a mechanical angle of 60 [degM]. The end point of the subdivision signal sg124' corresponds to a mechanical angle of 120 [degM]. The end point of the subdivision signal sg136' corresponds to a mechanical angle of 180 [degM]. The end point of the subdivision signal sg148' corresponds to a mechanical angle of 240 [degM]. The end point of the subdivision signal sg160' corresponds to a mechanical angle of 300 [degM]. The end point of the subdivision signal sg172' corresponds to a mechanical angle of 360 [degM].

A specific example of joining subdivision signals which are worth one cycle of electrical angle, as performed by the line segment joining section 323, will be described. FIG. 6B is a diagram describing joining of subdivision signals which are worth one cycle of electrical angle according to the present embodiment. In the diagram of FIG. 6B, subdivision signals sg101' through sg112' pertaining to the period E1 in FIG. 6A are joined. In FIG. 6B, the horizontal axis represents the rotor angle [degE]. The vertical axis represents the digital value. The example shown in FIG. 6B is an example where the rotor R is undergoing CW rotation. In FIG. 6B, the subdivision signals sg101' through sg112' are signals resulting from the subdivision signals sg101 through sg112 being joined together by the line segment joining section 323 in FIG. 6A. Points p101 through p113 are points replacing the crossings cp1 through cp7 and zero-crossings zc1 through zc6 in FIG. 6A. The curve g132 is a curve obtained by joining together the subdivision signals sg101' through sg112'.

In the following, the forward direction is a direction in which the digital value increases with increase in the rotor angle. The line segment joining section 323 replaces the crossing cp1 with the point p101, for example. The line segment joining section 323 joins the subdivision signal sg101' in the forward direction. Specifically, the line segment joining section 323 replaces the subdivision signal sg101 in FIG. 6A with the subdivision signal sg101', whose start point is the point p101 and end point is the point p102. Moreover, the line segment joining section 323 replaces the zero-crossing zc1 with the point p102.

Moreover, the line segment joining section 323 joins the subdivision signal sg102' in the forward direction. Specifically, the subdivision signal sg101 in FIG. 6A is replaced with the subdivision signal sg102', whose start point is the point p102 and end point is the point p103. Moreover, the line segment joining section 323 replaces the crossing cp2 with the point p103.

As indicated by the curve g132 in FIG. 6B, the line segment joining section 323 joins the subdivision signals sg101' through sg112' shown in FIG. 6A, sequentially in the forward direction. As a result, the crossing cp1 at the rotor angle θ101 is replaced with a digital value of 0. Moreover, the line segment joining section 323 replaces the crossing cp7 in the rotor angle θ113 with a digital value of 1200. In FIG. 6B, a digital value of 12000 corresponds to 360 [degE] constituting one cycle of electrical angle.

A specific example of joining of subdivision signals over the course of one cycle of mechanical angle, through operation of the line segment joining section 323, will be described with reference to FIG. 7.

In the first cycle E1, the line segment joining section 323 sequentially joins the subdivision signals sg101 through sg112 in FIG. 6A in the forward direction, over the course of one cycle of electrical angle. As a result, as indicated by the subdivision signals sg101' through sg112' in FIG. 6B, the subdivision signals sg101 through sg112 in FIG. 6A become joined.

Next, at the second cycle E2, to the end point of the subdivision signal sg112', the line segment joining section 323 joins the start point of the subdivision signal sg113' of the second cycle E2. Then, the line segment joining section 323 joins the subdivision signals sg113 through sg124 which are worth one cycle of electrical angle in the forward direction. As a result, as indicated by the subdivision signals sg113' through sg124' in FIG. 7, the subdivision signals sg113 through sg124 become joined.

Thereafter, to the end point of the subdivision signal sg124' of the second cycle E2, the line segment joining section 323 joins the start point of the subdivision signal sg125' of the third cycle E3. Next, to the end point of the subdivision signal sg136' of the third cycle E3, the line segment joining section 323 joins the start point of the subdivision signal sg137' of the fourth cycle E4. Next, to the end point of the subdivision signal sg148' of the fourth cycle E4, the line segment joining section 323 joins the start point of the subdivision signal sg149' of the fifth cycle E5. Next, to the end point of the subdivision signal sg160' of the fifth cycle E5, the line segment joining section 323 joins the start point of the subdivision signal sg161' of the sixth cycle E6.

FIG. 7 is a diagram describing an example result of joining subdivision signals which are worth one cycle of mechanical angle, according to the present embodiment. As shown in FIG. 7, Each cycle of electrical angle contains 12 subdivision signals. The first cycle E1 contains the subdivision signals sg101' through sg112'. The second cycle E2 contains the subdivision signals sg113' through sg124'. The third cycle E3 contains the subdivision signals sg125' through sg136'. The fourth cycle E4 contains the subdivision signals sg137' through sg148'. The fifth cycle E5 contains the subdivision signals sg149' through sg160'. The sixth cycle E6 contains the subdivision signals sg161' through sg172'.

Therefore, the cycle Kl, which is equivalent to one cycle of mechanical angle, contains 72 subdivision signals sg101' through sg172'.

Next, the process of mechanical angle generation which is performed by the position estimation section 30 at step S105 in FIG. 4 will be described. Herein, the mechanical angle at a given point on sg102' will be described. The mechanical angle positions of sg102' are within the period E1 in FIG. 7, an enlarged diagram of this period E1 being given in FIG. 6B. The line segment joining section 323 adds a value which is obtained by subtracting an immediately previous crosspoint signal value zc1 from the digital value of an intermediate signal, to the immediately previous crosspoint signal value zc1. Moreover, as described above, the line segment joining section 323 replaces the crosspoint signal value zc1 with the point p102. Then, to the point p102, the line segment joining section 323 adds a value which is obtained by subtracting the immediately previous crosspoint signal value zc1 from the digital value of the intermediate signal. Based on the length of the line segments of the subdivision signals having been joined by the line segment joining section 323, the position estimation section 30 estimates a mechanical angle position of the rotor.

Specific examples of information to be stored in the storage section 33 will be described.

The storage section 33 stores a relationship between numbers of pole pairs, sections, and segments. Moreover, the storage section 33 stores relative magnitudes of the three detection signals Hu0', Hv0' and Hw0' for each section. The relative magnitudes of the detection signals Hu0', Hv0' and Hw0' and their relative magnitudes with respect to the reference value are used to determine the ordinal numbers of sections.

In the method of position estimation according to the present embodiment, a detection signal is divided into two segments at a zero-crossing. As a result of this, one round of mechanical angle contains 72 subdivision signals. Consequently, in the method of position estimation according to the present embodiment, one subdivision signal has a short length. This allows the combined subdivision signals to become closer to a more ideal linear signal which is proportional to angles. Moreover, in the method of position estimation according to the present embodiment, positions (as angle information of the rotor R) are obtained on the basis of subdivision signals of near-linear shapes. Since the position estimation section 30 estimates a position of the rotor R by using line segments thus joined, the present embodiment is able to achieve a highly precise position detection, without requiring a high-precision optical encoder.

The motor controlling system 1 is able to perform position control by using a mechanical angle Θ^ which has been estimated in this manner. As a result, in the method of position estimation according to the present embodiment, the detection section to detect the position of the rotor R does not require any encoder that is susceptible to influences of the environment. This allows the motor to be downsized, and the precision of position control is not susceptible to influences of the environment, e.g., dust particles.

[Variants]

Although the present embodiment has described an example where crossings and zero-crossings are detected, and any detection signal between a crossing and a zero-crossing is detected as a subdivision signal, this is not a limitation.

For example, the subdivision detection section 322 may extract any detection signal from a crossing to a crossing which is adjacent to that crossing, as a subdivision signal. Then, the subdivision detection section 322 may subdivide the extracted subdivision signal into two subdivision signals at a zero-crossing that is located between the crossing and the crossing which is adjacent to that crossing.

Although the present embodiment has described an example where the position calculating section 32 applies the respective processes to the detection signals Hu0', Hv0' and Hw0' having been converted into digital signals, this is not a limitation. For example, the position calculating section may apply the respective processes to the detection signals Hu0, Hv0 and Hw0 as analog signals.

In the present embodiment, the method of driving the motor M may be a vector control technique, or any other driving technique, for example. Other methods of driving may be, for example, driving techniques using 120-degree rectangular waves or sine waves.

Although the present embodiment has described a 12-pole motor M as an example, this is not a limitation. The number of poles in the motor M may be e.g. 2 poles, 4 poles, 8 poles, and so on. For example, in the case of an 8-pole motor, one cycle of mechanical angle contains subdivision signals which are worth four cycles of electrical angle. In this case, if the detection section outputs three-phased detection signals, one cycle of electrical angle contains 12 subdivision signals; therefore, one cycle of mechanical angle contains 48 (=12×4) subdivision signals. In the case of an 8-pole motor, if the rotor R is undergoing CW rotation, the line segment joining section 323 may sequentially combine 48 subdivision signals which are worth one cycle of mechanical angle, in the forward direction.

If the rotor R is undergoing CCW rotation, at step S104 in FIG. 4, the line segment joining section 323 may allow subdivision signals which are worth one cycle of mechanical angle to be joined in the backward direction. As used herein, CCW means counterclockwise rotation as viewed from the output shaft. The backward direction is a direction in which the digital value decreases with increase in the rotor angle. The line segment joining section 323 may allow the joined subdivision signals, which are worth one cycle of mechanical angle, to be sequentially joined in the descending direction from 360 [degM] to 0 [degM], with increase in the rotor angle. In this case, when a change occurs in the relative magnitudes of the three detection signals Hu0', Hv0' and Hw0' as stored in the storage section 33, the position estimation section 30 determines whether the rotor R is undergoing CW rotation or CCW rotation.

As a result, according to this embodiment, irrespective of whether the rotor R is undergoing CW rotation or CCW rotation, the position of the rotor R can be estimated with good precision.

The relationship between the rotation direction and the detection signals will be described with reference to FIG. 6A.

If the current position is between the rotor angles θ105 and θ107, the position estimation section 30 causes the storage section 33 to store a digital value as taken on the vertical axis at the current position, and a digital value as taken on the vertical axis at the rotor angle θ105, which is the immediately previous crossing, for example.

In the case where the rotor R is undergoing CW rotation, the position of the rotor R will move to between the rotor angles θ107 and θ109. The position estimation section 30 determines a transition in the intermediate signal when switching from magnitude relationship between the rotor angles θ105 and θ107 to magnitude relationship between the rotor angles θ107 and θ109 and also when switching from the detection signal Hv0' to the detection signal Hu0', and determines whether the intermediate signal after the transition is positive or negative with respect to a reference value, thus judging that the rotor R is undergoing CW rotation. Then, the position estimation section 30 causes the subdivision signals sg107 and sg108 between the rotor angles θ107 and θ109 to be joined to the subdivision signal sg106 in the forward direction.

On the other hand, in the case where the rotor R is undergoing CCW rotation, the position of the rotor R will move to between the rotor angles θ103 and θ105. The position estimation section 30 determines a transition in the intermediate signal when switching from magnitude relationship between the rotor angles θ105 and θ107 to magnitude relationship between the rotor angles θ103 and θ105 and also when switching from the detection signal Hv0' to the detection signal Hw0', and determines whether the intermediate signal after the transition is positive or negative with respect to a reference value, thus judging that the rotor R is undergoing CCW rotation. Then, the position estimation section 30 causes the subdivision signals sg103 and sg104 between the rotor angles θ103 and θ105 to be joined to the subdivision signal sg105 in the backward direction.

Although the present embodiment has described Hall generators as an example of sensors in the detection section 10, this is not a limitation. The sensors used in the detection section 10 may produce detection signals which are sine waves, or output signals that are based on sine waves but contain harmonics. For example, the sensors in the detection section 10 may be sensors utilizing magnetoresistance.

The present embodiment has described an example of extracting a portion of a detection signal from a crossing to a zero-crossing which is adjacent to that crossing, or from a zero-crossing to a crossing which is adjacent to that zero-crossing, as a subdivision signal; however, this is not a limitation. The subdivision detection section 322 may generate a line segment from a crossing to a zero-crossing which is adjacent to that crossing, or from a zero-crossing to a crossing which is adjacent to that zero-crossing, thereby extracting a subdivision signal. The line segment may be a straight line, or a portion of a sine wave, for example.

Although the present embodiment has illustrated an outer rotor example in FIG. 2, this is not a limitation. The motor M may be a brushed motor such that slots are parts of the rotor R.

Furthermore, the motor M may be a linear motor. In the case where the motor M is a linear motor, the rotor R may be a mover including magnets, for example.

Although the present embodiment has described an example where the detection section 10 includes three sensors 11 to 13 that are displaced in phase by 120 degrees, this is not a limitation. The number of sensors in the detection section 10 is not limited to three. In this case, the outputs from the sensors may be displaced in phase by an angle determined through division by the total number of sensors.

Although the present embodiment has described an example where the crossing detection section 321 detects crossings and zero-crossings, this is not a limitation. The crossing detection section 321 may only detect crossings. In this case, the subdivision detection section 322 may sequentially detect a portion of a detection signal from a crossing to a crossing which is adjacent to that crossing as a subdivision signal. In this case, the number of subdivision signals which are worth one cycle of electrical angle is six. When the number of pole pairs in the motor M is six, the number of subdivision signals which are worth one cycle of mechanical angle is 36.

Second Embodiment

In the present embodiment, an example where the position estimation section 30 according to the first embodiment further includes a correction section will be described.

Figure 8:
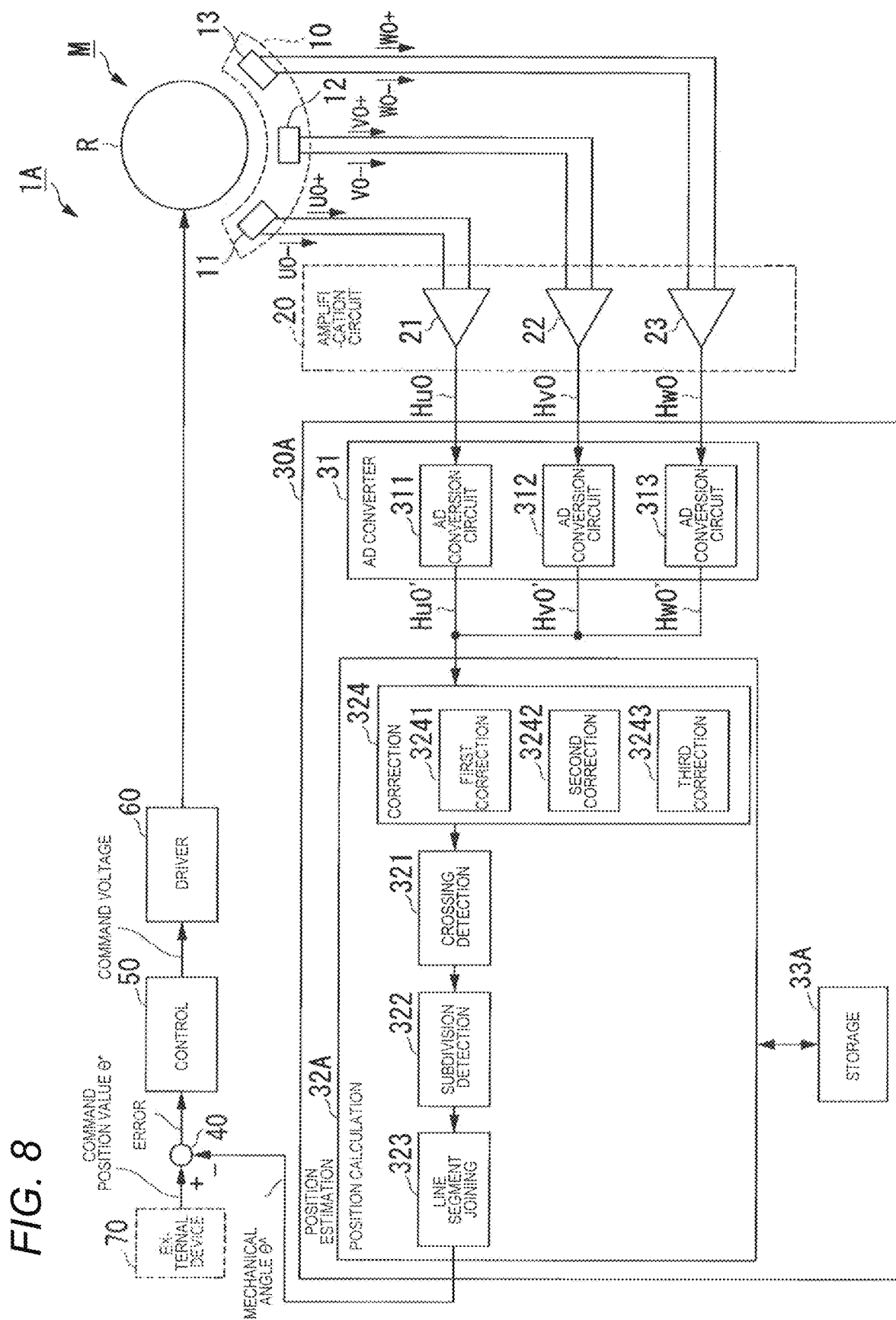
FIG. 8 A schematic diagram showing the construction of a motor controlling system according to a second embodiment.

FIG. 8 is a schematic diagram showing the construction of a motor controlling system 1A according to the present embodiment.

As shown in FIG. 8, the motor controlling system 1A includes a position estimation section 30A, instead of the position estimation section 30.

The position estimation section 30A includes a position calculating section 32A instead of the position calculating section 32, and includes a storage section 33A instead of the storage section 33.

Furthermore, the position calculating section 32A includes a correction section 324.

The correction section 324 includes a first correction section 3241, a second correction section 3242, and a third correction section 3243. In addition to the AD conversion section 31, the correction section 324 also functions as a part of the preprocessing circuit.

While the rotor R is rotating, the first correction section 3241 corrects for an inphase noise of a detection signal of each phase, and outputs the corrected detection signal to the second correction section 3242. Note that an inphase noise is a noise component that a detection signal of each phase contains.

As has been described with reference to FIG. 3, the detection signals Hu0, Hv0 and Hw0 have offset components. Moreover, as has been described with reference to FIG. 3, there are variations among peak values of the detection signals Hu0, Hv0 and Hw0. Peak values are the local maximums and local minimums of a detection signal. The position calculating section 32A applies each process to a detection signal in the form of a digital signal. The second correction section 3242 is employed in order to make effective use of the dynamic range of the position calculating section 32A. While the rotor R is rotating, variations in amplitude among the detection signals and their offset components are corrected for, and the corrected detection signals are output to the third correction section 3243.

The third correction section 3243 is employed in order to correct the schematically S-shape of a subdivision signal into a line. Since a subdivision signal is a portion of a detection signal, it has a schematically S-shape. Therefore, by applying the correction at the third correction section 3243, corrected detection signals are output to the crossing detection section 321.

The storage section 33A further stores correction equations to be used by the correction section 324 for corrections, as well as correction values and coefficients for use in the corrections. The correction equations and coefficients will be described later.

Next, a procedure of correction processes to be performed by the position calculating section 32A will be described.

The operation of the motor controlling system 1 according to the present embodiment includes a first correction step, a second correction step, and a third correction step.

Figure 9:
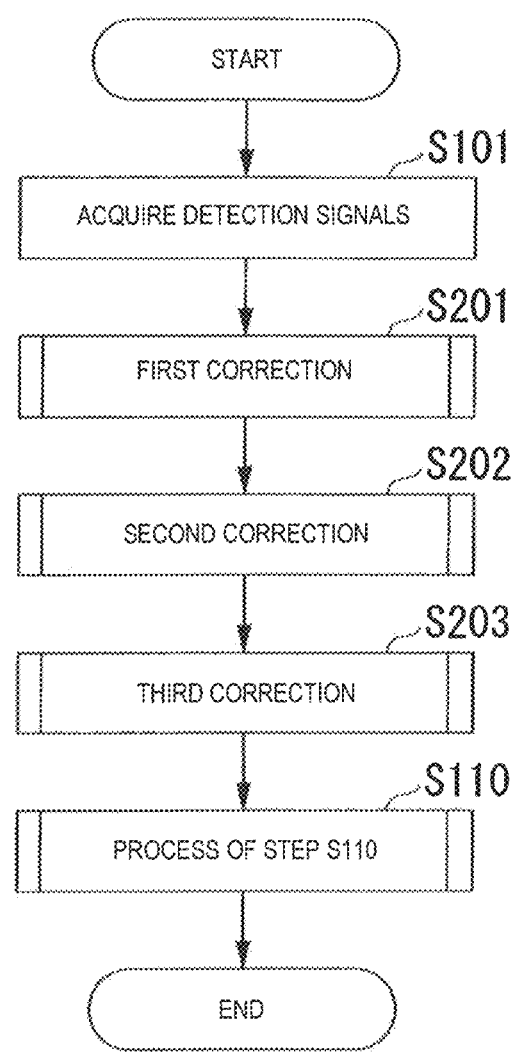
FIG. 9 A flowchart of a procedure of processing performed by a position calculating section according to the second embodiment.

FIG. 9 is a flowchart of a procedure of processing to be performed by the position calculating section 32A according to the present embodiment. In the example shown in FIG. 9, an instance where the correction section 324 performs all of the first through third corrections will be described. Moreover, any process that is identical a process which has been described with reference to FIG. 7 will be denoted by an identical numeral, and its description will be omitted. The position estimation section 30A performs the following processes.

(step S201) The first correction section 3241 performs a first correction. The first correction will be described later.

(step S202) After the first correction, the second correction section 3242 performs a second correction. The second correction will be described later.

(step S203) After the second correction, the third correction section 3243 performs a third correction. The third correction will be described later.

After the process of step S203, the correction section 324 performs a process of step S110.

Thus, the processes to be performed by the position calculating section 32A are completed.

<Explanation of First Correction>

Next, a procedure of processing of the first correction performed by the first correction section 3241 at step S201 in FIG. 9 will be described.

Figure 10:
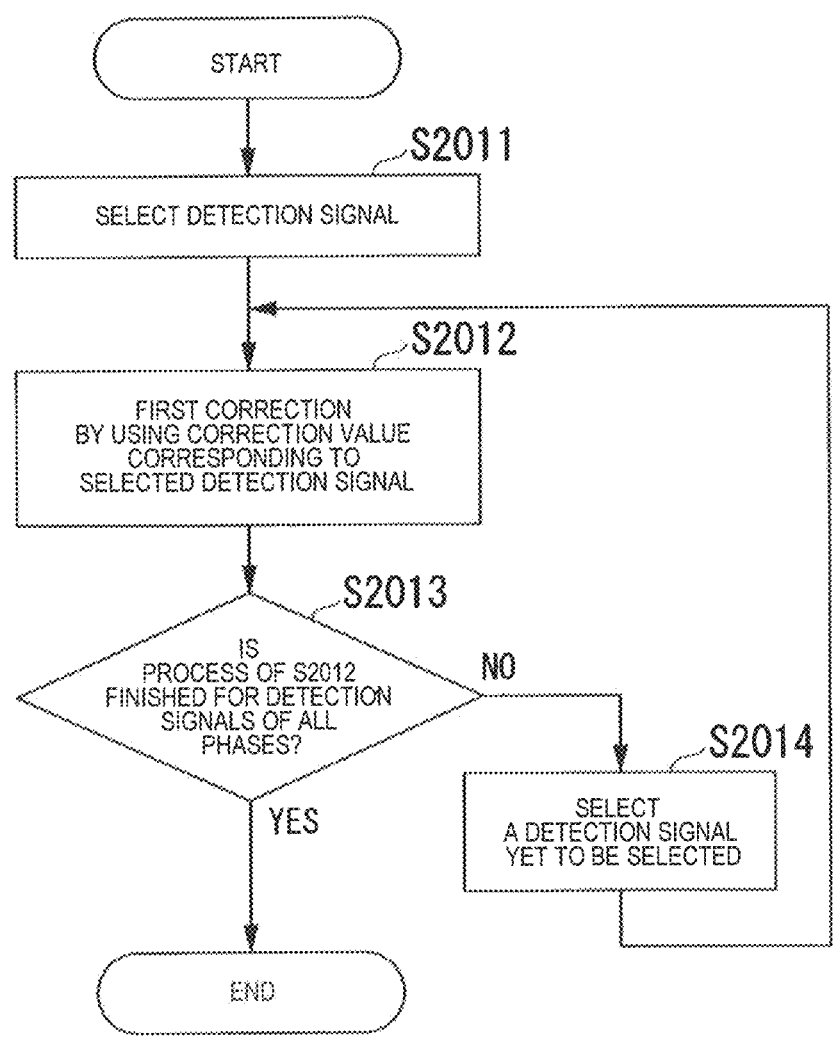
FIG. 10 A flowchart of a procedure of processing of a first correction according to the second embodiment.

FIG. 10 is a flowchart of a procedure of processing of the first correction according to the present embodiment.

(step S2011) The first correction section 3241 sequentially selects one of U-phase, V-phase, and W-phase detection signals.

(step S2012) By using a correction equation corresponding to the selected detection signal, the first correction section 3241 performs the first correction. The correction equations are equations (1) through (3), which will be described later. For example, if the U-phase detection signal is selected at step S2011, the first correction section 3241 performs the first correction by using equation (1).

(step S2013) The first correction section 3241 determines whether or not the process of step S2012 has been finished for detection signals of all phases. Upon determining that the process of step S2012 has been finished for detection signals of all phases (step S2013; YES), the first correction section 3241 ends the process. Upon determining that the process of step S2012 has not been finished for detection signals of all phases (step S2013; NO), the first correction section 3241 proceeds to the process of step S2014.

(step S2014) The first correction section 3241 selects a detection signal of a phase yet to be selected, and returns to the process of step S2012.

Next, the first correction performed by the first correction section 3241 will be described in detail.

To the three detection signals Hu0', Hv0' and Hw0', the first correction section 3241 applies the first correction by using equations (1) through (3) as follows.

$$Hiu0' = Hu0' - (Hv0' + Hw0')/2 \quad (1)$$

$$Hiv0' = Hv0' - (Hu0' + Hw0')/2 \quad (2)$$

$$Hiw0' = Hw0' - (Hu0' + Hv0')/2 \quad (3)$$

In equation (1), Hiu0' is a corrected value resulting from applying the first correction to the detection signal Hu0'. In equation (2), Hiv0' is a corrected value resulting from applying the first correction to the detection signal Hv0'. In equation (3), Hiw0' is a corrected value resulting from applying the first correction to the detection signal Hw0'. As described above, in the first correction step, the correction section 324 consecutively selects one of the detection signals, and subtracts a mean value of the other unselected detection signals from the selected detection signal, thereby generating, for each detection signal, a detection signal into which the selected detection signal has been corrected.

Next, effects of the first correction will be described.

Figure 11:
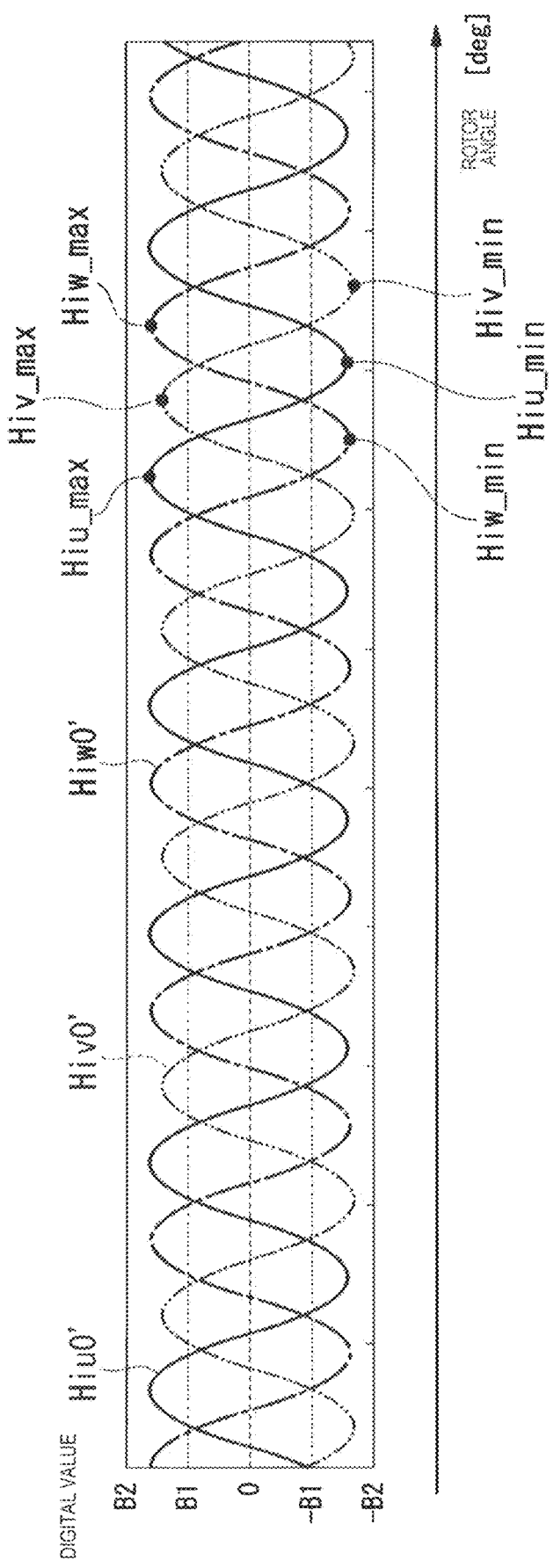
FIG. 11 A waveform diagram of an example result of performing the first correction according to the second embodiment.

FIG. 11 is a waveform diagram of an example result of performing the first correction according to the present embodiment. The waveform diagram shown in FIG. 11 shows waveforms which are obtained by, after the waveforms shown in FIG. 3 are converted into digital signals, correcting them with the first correction section 3241 by using equations (1) through (3). In FIG. 11, the horizontal axis represents the rotor angle [deg]; the vertical axis represents the digital value. In the case where the number of bits in the AD conversion section 31 is 12 bits, B2 is 2047, and −B2 is −2048. As shown in FIG. 11, through the first correction, the first correction section 3241 is able to reduce fluctuations in the digital value of each detection signal. Thus, through the first correction, the first correction section 3241 is able to reduce inphase noises.

Now, the reason for being able to reduce inphase noises will be described.

An inphase noise signal, designated as Hn0', occurs in each of the three detection signals. The detection value Hiu0' after correction by equation (1), in which the inphase noise signal Hn0' has been accounted for, is expressed by equation (4) below.

$$Hiu0' = (Hu0' + Hn0') - \{(Hv0' + Hn0') + (Hw0' + Hn0')\}/2 \quad (4)$$
$$= (Hu0' + Hn0') - \{Hn0' + (Hv0' + Hw0')/2\}$$
$$= Hu0' - (Hv0' + Hw0')/2$$

As indicated by equation (4), the inphase noise Hn0' which is on the detection signal of each phase is cancelled out by the correction under equation (1). Thus, the first correction can reduce an inphase noise.

Similarly, an inphase noise of the detection signal Hv0' can be reduced by equation (2). An inphase noise of the detection signal Hw0' can be reduced by equation (3).

In the case where the motor M is four-phased, for example, the first correction section 3241 selects one of the four phases of detection signals. The four-phased detection signals are U-phase, V-phase, W-phase, and Z-phase. Next, the first correction section 3241 performs the first correction by using a correction equation that corresponds to the selected detection signal. In other words, in the case of a four-phased motor M, the first correction section 3241 performs the first correction by using four correction equations for the respective phases. For example, a correction equation for the U-phase detection signal is equation (5) below.

$$Hiu0'=Hu0'-(Hv0'+Hw0'+Hz0')/3 \qquad (5)$$

Even in the case of a motor for which the detection section outputs four phases of detection signals, the first correction section 3241 is able to reduce inphase noises through the first correction by using four correction equations for the respective phases. In other words, according to the present embodiment, inphase noises can be reduced through the first correction by using correction equations in accordance with the number of phases.

<Explanation of Second Correction>

Next, a procedure of processing of the second correction performed by the second correction section 3242 at step S202 in FIG. 9 will be described.

In one cycle of electrical angle, the second correction section 3242 sequentially selects one of U-phase, V-phase, and W-phase detection signals. Next, the second correction section 3242 applies the second correction to the detection signal of the selected phase, by using a correction value which is stored in the storage section 33A, and a correction equation corresponding to the detection signal of the selected phase. The correction equations are equations (6) through (11) described below. For example, when the U-phase detection signal is selected, the second correction section 3242 performs the second correction by using equations (6) and (7).

Next, the local maximums and local minimums of each detection signal will be described with reference to FIG. 11.

In the following, a point Hiu_max is an example of a local maximum of the U phase. A point Hiv_max is an example of a local maximum of the V phase. A point Hiw_max is an example of a local maximum of the W phase. A point Hiu_min is an example of a local minimum of the U phase. A point Hiv_min is an example of a local minimum of the V phase. A point Hiw_min is an example of a local minimum of the W phase. Herein, bu, bv and bw are offset correction values for the respective phases as stored in the storage section 33A.

Next, the second correction performed by the second correction section 3242 will be described in detail.

For a detection signal of each phase, the second correction section 3242 determines whether its digital value is positive or negative. As used herein, a positive digital value is a digital value which is greater than 0 in FIG. 11. A negative digital value is a digital value which is smaller than 0 in FIG. 11. The second correction section 3242 performs a correction of uniformizing the amplitude range to fit within a range bounded by a predetermined maximum value B2 and a predetermined minimum value −B2.

To a positive digital value of the detection signal Hiu0' after correction, the second correction section 3242 applies the second correction under equation (6) below, by using information which is stored in the storage section 33A. To a negative digital value of the detection signal Hiu0' after correction, the second correction section 3242 applies the second correction under equation (7) below, by using information which is stored in the storage section 33A.

To a positive digital value of the detection signal Hiv0' after correction, the second correction section 3242 applies the second correction under equation (8) below, by using information which is stored in the storage section 33A. To a negative digital value of the detection signal Hiv0' after correction, the second correction section 3242 applies the second correction under equation (9) below, by using information which is stored in the storage section 33A.

To a positive digital value of the detection signal Hiw0' after correction, the second correction section 3242 applies the second correction under equation (10) below, by using information which is stored in the storage section 33A. To a negative digital value of the detection signal Hiw0' after correction, the second correction section 3242 applies the second correction under equation (11) below, by using information which is stored in the storage section 33A.

$$Hiu1(ppn)'=au\_max(ppn)\times(Hiu0'(ppn)+bu \qquad (6)$$

$$Hiu1(ppn)'=au\_min(ppn)\times(Hiu0'(ppn)+bu \qquad (7)$$

$$Hiv1(ppn)'=av\_max(ppn)\times(Hiv0'(ppn)+bv \qquad (8)$$

$$Hiv1(ppn)'=av\_min(ppn)\times(Hiv0'(ppn)+bv \qquad (9)$$

$$Hiw1(ppn)'=aw\_max(ppn)\times(Hiw0'(ppn)+bw \qquad (10)$$

$$Hiw1(ppn)'=aw\_min(ppn)\times(Hiw0'(ppn)+bw \qquad (11)$$

In equations (6) and (7), Hiu1' is a corrected value resulting from applying the second correction to a U-phase detection signal. In equations (8) and (9), Hiv1' is a corrected value resulting from applying the second correction to a V-phase detection signal. In equations (10) and (11), Hiw1' is a corrected value resulting from applying the second correction to a W-phase detection signal.

In equations (6) through (11), ppn is an integer from 1 to 6, which is a value representing magnetic pole pairs. In equations (6), (8) and (10), au_max(ppn), av_max(ppn) and aw_max(ppn) are positive gain correction values for positive digital values corresponding to the respective magnetic pole pairs as stored in the storage section 33A, over the course of one cycle of electrical angle. In equations (7), (9) and (11), au_min(ppn), av_min(ppn) and aw_min(ppn) are negative gain correction values for negative digital values corresponding to the respective magnetic pole pairs as stored in the storage section 33A, over the course of one cycle of electrical angle. In equations (6) through (11), bu, bv and bw are offset correction values for the respective phases as stored in the storage section 33A.

Note that au_max(ppn), av_max(ppn), aw_max(ppn), au_min(ppn), av_min(ppn) and aw_min(ppn) are correction values for the respective pole pairs. Therefore, the number of positive gain correction values is 18 (=3 phases×6 pole pairs). Similarly, the number of negative gain correction values is 18.

Next, effects of the second correction will be described.

Figure 12:
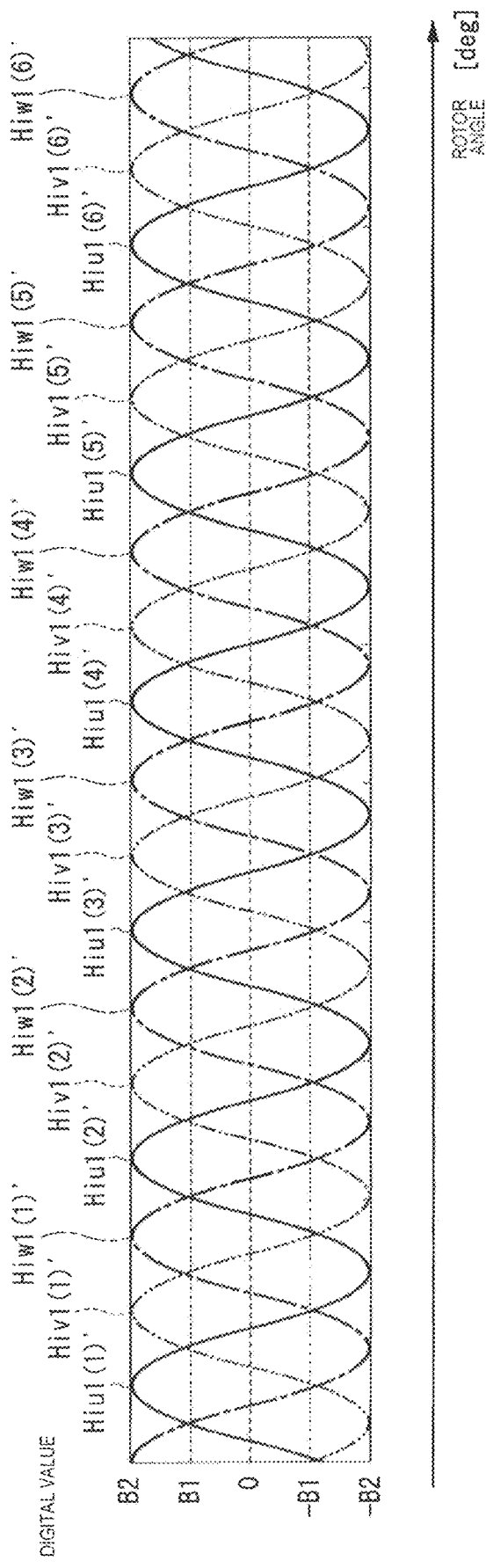
FIG. 12 A waveform diagram of an example result of performing a second correction according to the second embodiment.

FIG. 12 is a waveform diagram showing an example result of performing the second correction according to the present embodiment. The waveform diagram shown in FIG. 12 is a waveform, after the second correction, having been corrected by the second correction section 3242. In FIG. 12, the horizontal axis represents the rotor angle [deg]; the vertical axis represents the digital value.

As shown in FIG. 12, the second correction corrects for offset components in the detection signals. Moreover, through the second correction, the amplitude range is essentially uniformized into the range+B2 from −B2. Through this correction, the position estimation section 30B is able to make effective use of the available range of digital signal values in each portion.

Thus, through the second correction, detection offset components of the respective phases of signal Hiu0', Hiv0' and Hiw0' can be reduced, and the amplitude of each pole in each phase can be adjusted.

<Explanation of Corrections Through Online Processing>

Although the present embodiment has described an example where positive gain correction values, negative gain correction values, and offset correction values are stored in the storage section 33A, this is not a limitation. Via online processing, the second correction section 3242 may calculate positive gain correction values, negative gain correction values, and offset correction values. For example, the second correction section 3242 may use detection signals from the immediately previous cycle of mechanical angle to calculate positive gain correction values, negative gain correction values, and offset correction values.

Next, a calculation step for offset correction values, positive gain correction values, and negative gain correction values that is performed by the second correction section 3242 will be described.

Figure 13:
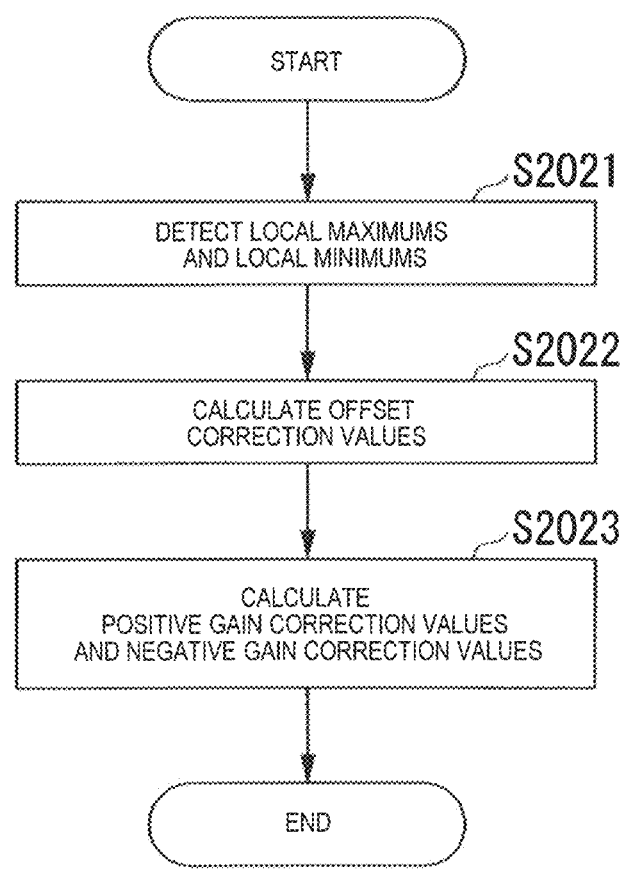
FIG. 13 A flowchart showing a process of calculating offset correction values, positive gain correction values, and negative gain correction values according to the second embodiment.

FIG. 13 is a flowchart showing a process of calculating offset correction values, positive gain correction values, and negative gain correction values according to the present embodiment.

(step S2021) The second correction section 3242 detects local maximums and local minimums of each phase, over the course of six cycles of electrical angle.

(step S2022) In a period equivalent to six cycles of electrical angle, the second correction section 3242 calculates an offset correction value for each phase. Specifically, the second correction section 3242 calculates mean values of maximum amplitude values and minimum amplitude values for each phase, over the course of six cycles of electrical angle. From the mean value of maximum amplitude values and the mean value of minimum amplitude values determined for each phase, a maximum-minimum mean value is calculated. The calculated maximum-minimum mean values are the offset correction values bu, bv and bw for the respective phases. What is signified by the six cycles of electrical angle here is a mean value over the course of the latest six cycles of electrical angle that have sequentially arrived. Instead of a mean value over the course of six cycles of electrical angle, the calculation may be based on a maximum amplitude value and a minimum amplitude value per cycle of electrical angle, over the course of at least two cycles. Next, the second correction section 3242 causes the storage section 33A to store the calculated offset correction value for each phase.

(step S2023) In a period equivalent to one cycle of electrical angle, the second correction section 3242 calculates a positive gain correction value and a negative gain correction value for each phase and for each pole pair. Then, for each phase and each pole pair subjected to calculation, the second correction section 3242 causes the storage section 33A to store the positive gain correction value and the negative gain correction value.

Based on the correction values that have been stored in the storage section 33A through the processes of steps S2021 through S2023, and the corresponding equations (6) through (11), the second correction section 3242 applies the second correction to detection signals over the course of the next one cycle of electrical angle, for example.

In the case where the motor M is e.g. four-phased, the second correction section 3242 may calculate an offset correction value, positive gain correction values, and negative gain correction values for each phase. In the case where the motor M is four-phased, there are four offset correction values. The number of positive gain correction values and the number of negative gain correction values are 24 each (=four phases×6 pole pairs). As described above, the operation of the motor controlling system 1 according to the present embodiment includes a local maximum/local minimum detection step, a mean calculation step, an offset calculation step, a first gain calculation step, and a second gain calculation step.

<Explanation of Third Correction>

Next, the third correction performed by the third correction section 3243 at step S203 in FIG. 9 will be described.

First, the reason for performing the third correction will be described.

Figure 14:
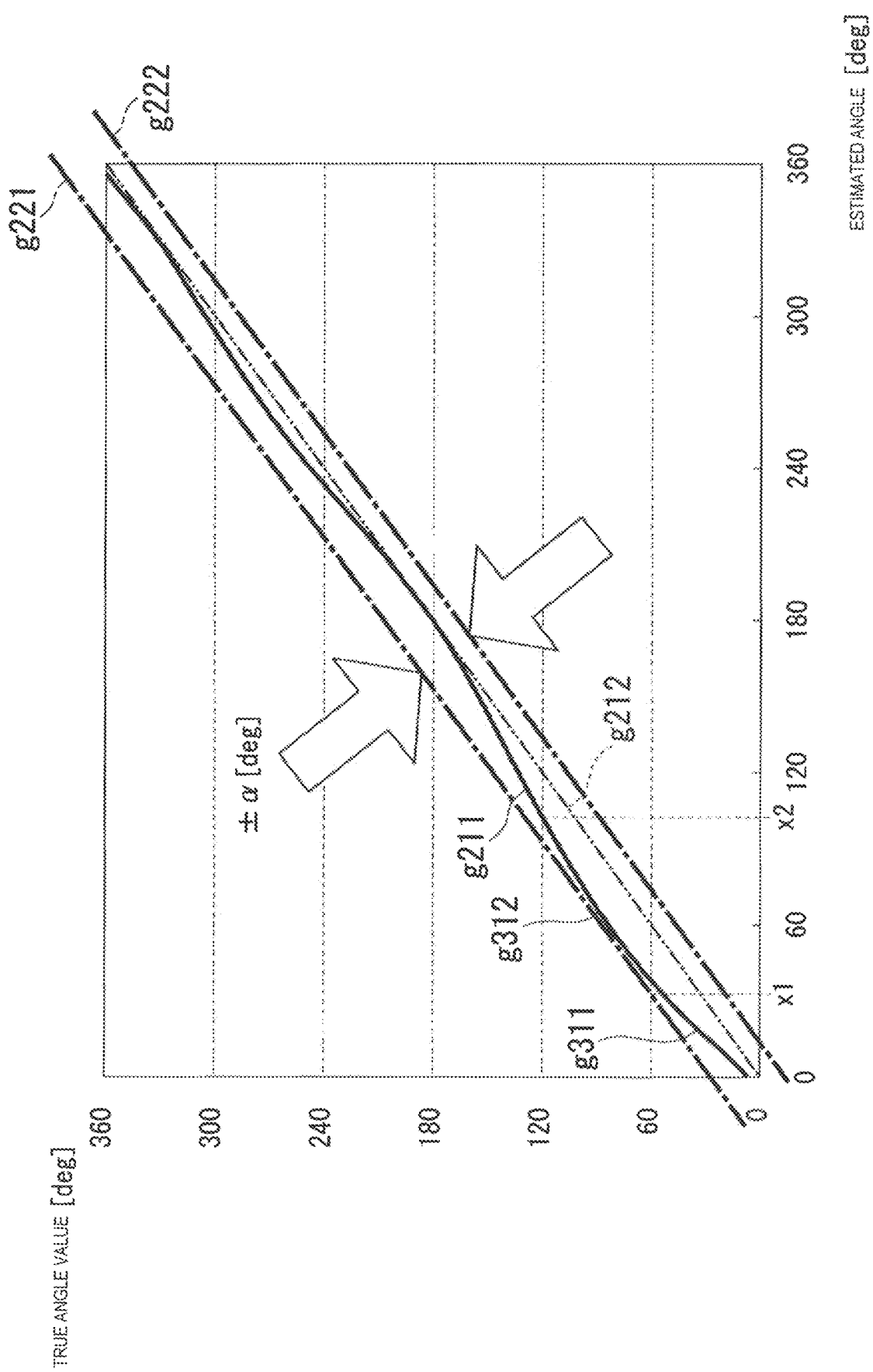
FIG. 14 A waveform diagram in which subdivision signals worth one cycle of electrical angle are combined according to the second present embodiment.

FIG. 14 is a waveform diagram in which subdivision signals worth one cycle of electrical angle are combined according to the present embodiment. The horizontal axis represents the estimated angle [deg]. The vertical axis represents the true angle value [deg].

In FIG. 14, a curve g211 is a waveform obtained by joining subdivision signals worth six cycles of electrical angle. A line g212 is an ideal line. A line g221 and a line g222 denote a range of variations in the curve g211.

The curve g211 shown in FIG. 14 is a waveform which results after, following the first through third corrections by the correction section 324, the subdivision signals from the subdivision detection section 322 as described in the first embodiment are joined by the line segment joining section 323. By performing these corrections and processes, as indicated by the line g221 and the line g222, a precision of position detection of about ±a[deg] is attained.

As described earlier, the subdivision signals are schematically S-shaped. When the third correction is not performed, the range of variation in the curve g211 will be greater than that illustrated in the example shown in FIG. 14. In other words, the precision of position detection will be associated with a greater value than ±α[deg]. Therefore, the third correction section 3243 performs the third correction by correcting the schematically S-shapes of the subdivision signals into lines. As a result, the precision of position detection can be further improved by the third correction.

Numerals g311, g312, x1 and x2 in FIG. 14 will be described in the third embodiment.

Next, the third correction will be described in detail.

By using a value that is stored in the storage section 33A as a coefficient for a detection signal of each phase, the third correction section 3243 performs the third correction of changing the scale of the detection signal.

Through the third correction, the schematically S-shape of each subdivision signal can be made into a line. Herein, the value stored in the storage section 33A is a predesigned value.

This third correction performs a calculation process based on a correction equation, e.g., a quadratic function, a cubic function, or a trigonometric function, by using the predesigned value.

In the following description, an example of applying the third correction to detection signals Hiu1', Hiv2' and Hiw1' after the second correction will be described.

Hiu2' is a corrected value resulting from applying the third correction to the U-phase detection signal after the second correction. Hiv2' is a corrected value resulting from applying the third correction to the V-phase detection signal after the second correction. Hiw2' is a corrected value resulting from applying the second correction to the W-phase detection signal after the second correction.

Next, effects of the third correction will be described.

Figure 15:
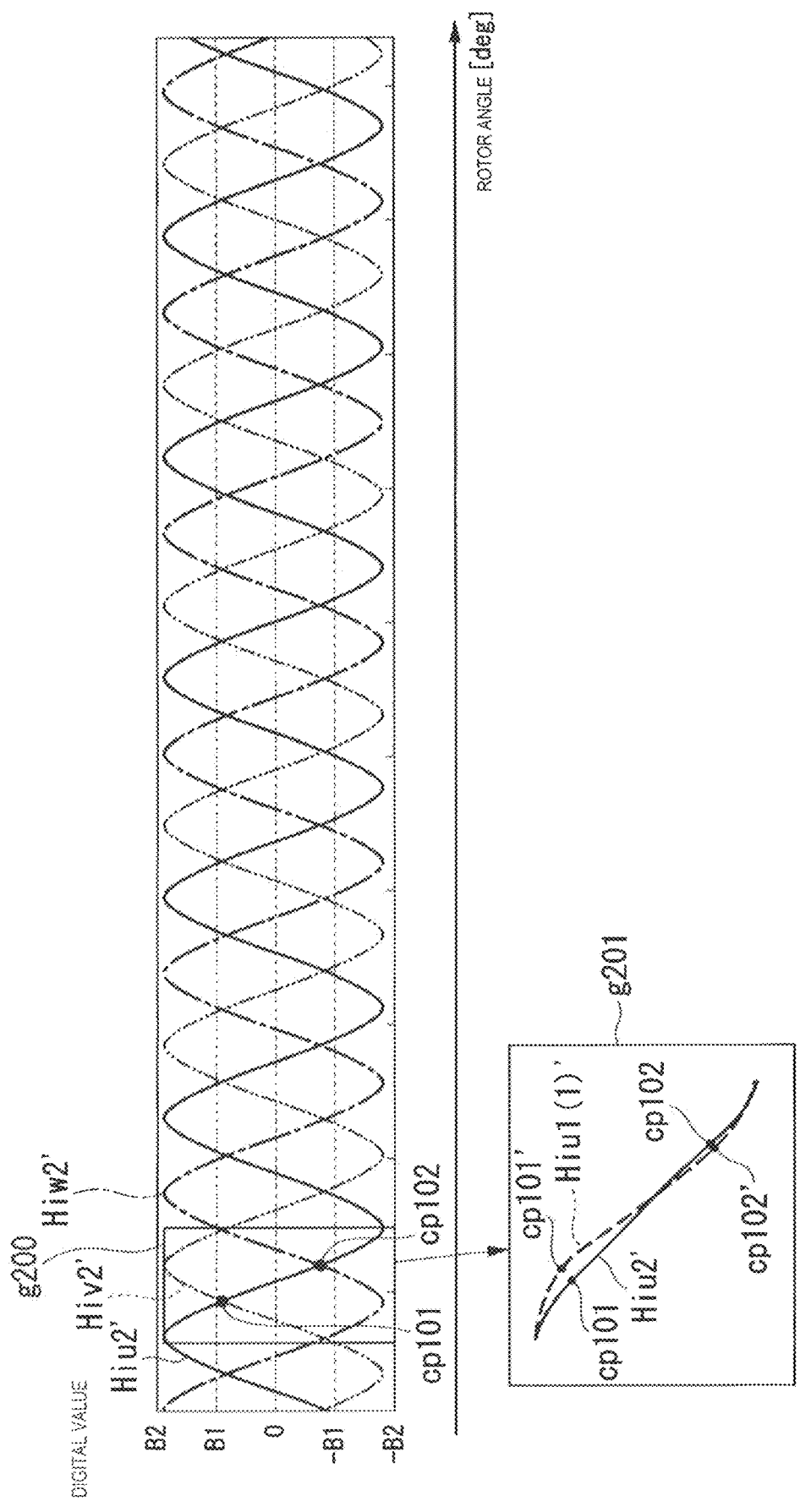
FIG. 15 A waveform diagram of an example result of performing a third correction according to the second embodiment of the present embodiment.

FIG. 15 is a waveform diagram showing an example result of performing the third correction according to the present embodiment. The waveform diagram shown in FIG. 15 is a waveform after the third correction was applied after applying the second correction. In FIG. 15, the horizontal axis represents the rotor angle [deg]; the vertical axis represents the digital value.

The waveforms in a region indicated by numeral g201 in FIG. 15 are enlarged waveforms of the waveforms in a region indicated by numeral g200. Among the waveforms in the region indicated by numeral g201, the curve Hiu1(1)' is a portion of the waveform of the detection signal Hiu1(1)', which was subjected to the second correction after the first correction. The curve Hiu2' is a portion of a waveform the detection signal Hiu2', which was subjected to the second correction after the first correction, and then further subjected to the third correction.

As compared to the curve Hiu1(1)' in the period from crossings cp101' through cp102', the curve Hiu2' in the period from crossings cp101 through cp102 has improved linearity as to the detection signal between the crossings.

Thus, through the third correction, the detection signals Hiu2', Hiv2' and Hiw2' attain improved linearity and provide signals that are more proportional to angles, as compared to the detection signals Hiu1(ppn)', Hiv1(ppn)' and Hiw1(ppn)' shown in FIG. 12.

Note that the third correction section 3243 performs a calculation process of the third correction process based on a correction equation which is in accordance with the shape of the waveform of a detection signal.

Instead of using predesigned values, the third correction section 3243 may use values which are sequentially calculated based on detection signals which are from the immediately previous cycle of mechanical angle, in a similar manner to the second correction. Then, the third correction section 3243 may cause the storage section 33A to store the calculated values as coefficients.

Although the above-described example has illustrated an instance where the correction section 324 performs all of the first through third corrections has been described, this is not a limitation. For example, the correction section 324 may apply at least one correction, among the first through third corrections, to the detection signal.

Thus, in the method of position estimation according to the present embodiment, inphase noises of detection signals can be reduced through the first correction. Moreover, in the present embodiment, variation among the plurality of detection signals can be corrected for through the second correction. As used herein, variation among the plurality of signals means, for example, variation in terms of amplitude of the detection signal and its offset component. Furthermore, in the present embodiment, curved portions of the waveforms can be made into lines through the third correction. In particular, subdivision signal lengths are uniformized through the second correction, which makes it easy to apply an identical calculation process to all subdivision signals in the third correction. Therefore, the second correction, when performed as a preceding step to the third correction, can better make curved portions of the waveforms into lines.

As a result, in the present embodiment, the signal portions that are needed for position information better approximate lines, thereby reducing the difference between an estimated position value and the true value, and achieving a highly precise position detection.

Although the present embodiment has described an example where the correction section 324 corrects detection signals which have been converted into digital signals, this is not a limitation. The correction section 324 may be provided between the amplification section 20 and the AD conversion section 31. In this case, the correction section 324 may correct the detection signals Hu0, Hv0 and Hw0 as analog signals. In the present embodiment, too, the number of sensors in the detection section 10 is not limited to three. In this case, the outputs from the sensors may be displaced in phase by an angle determined through division by the total number of sensors.

By using corrected detection signals in the manner described above, the motor controlling system 1 is able to perform position control with a higher precision. For example, when an optical encoder is used in detecting a rotary position of the rotor R as in the conventional techniques, the precision of detection will depend on the resolution of the encoder. Herein, the optical encoder may include a photointerrupter and an encoder disk, for example. The encoder disk has slits which are made at equal intervals along the circumference. For example, an encoder with a resolution of 400 pulses has a precision of detection of about ±0.9 degrees. On the other hand, the position estimation section 30 using the method of position estimation according to the present embodiment is able to realize a similar precision to the precision of detection of an optical encoder.

Third Embodiment

An example where the position estimation section 30 from the first embodiment further includes a normalization section will be described.

Figure 16:
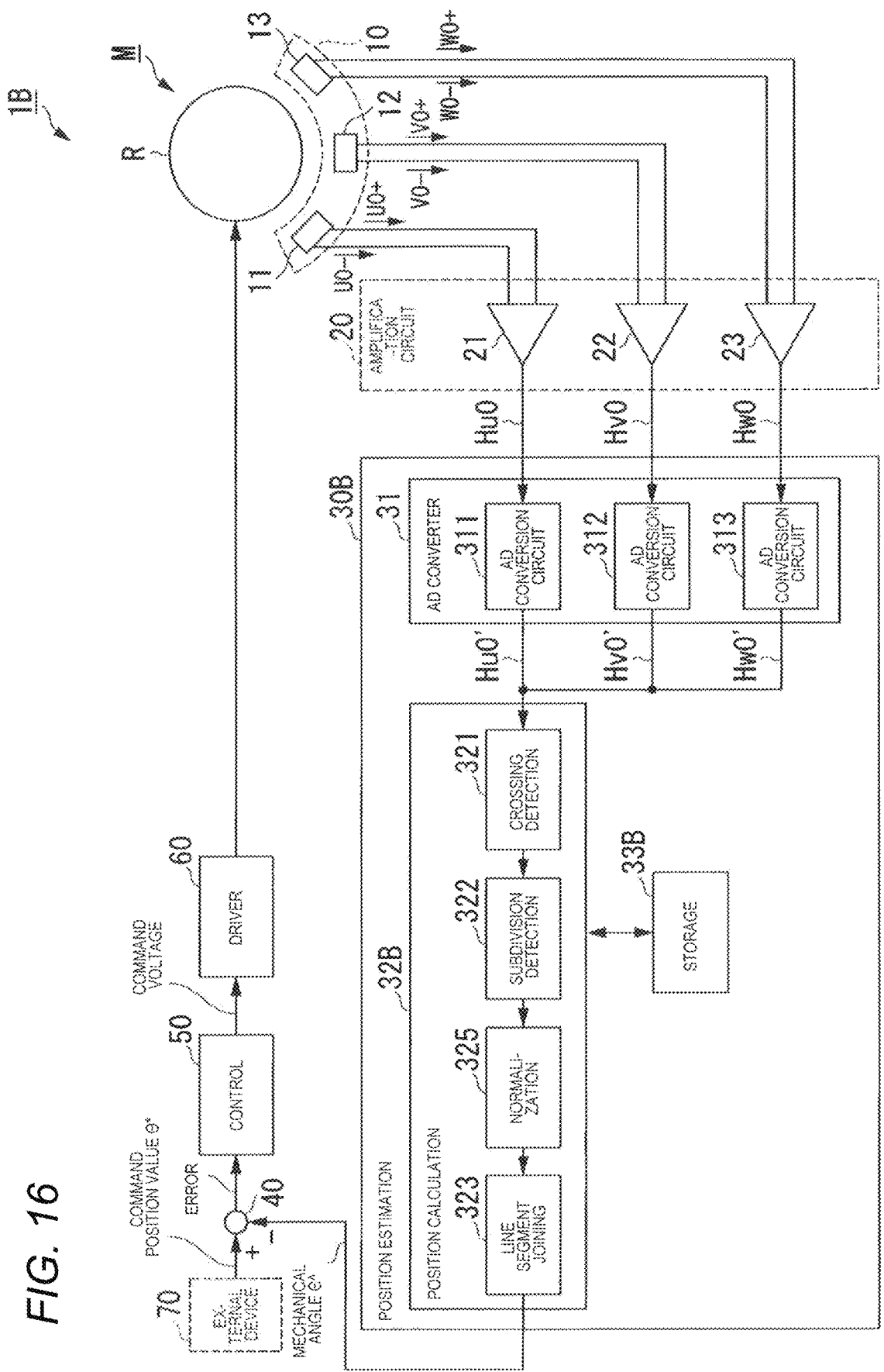
FIG. 16 A schematic diagram showing the construction of a motor controlling system according to a third embodiment.

FIG. 16 is a schematic diagram showing the construction of a motor controlling system 1B according to the present embodiment.

As shown in FIG. 16, the motor controlling system 1A includes a position estimation section 30B, instead of the position estimation section 30.

The position estimation section 30B includes a position calculating section 32B instead of the position calculating section 32, and includes a storage section 33B instead of the storage section 33.

Furthermore, the position calculating section 32B includes a normalization section 325. The normalization section 325 performs a correction of uniformizing the gradients of line segments of the subdivision signals detected by the subdivision detection section 322, and outputs corrected detection signals to the line segment joining section 323.

The storage section 33B further stores a normalization coefficient for each segment. The normalization coefficient will be described later.

<Explanation of Normalization>

First, the reason for performing normalization will be described with reference to FIG. 14.

Owing to detection sensitivities of the sensors 11 to 13 and errors in the positions at which they are attached, the detection signals from the sensors 11 to 13 may not have an identical shape, which would be ideal. Moreover, the phases of the detection signals may not have ideal dephasing. As a result, differences in the shapes of the detection signals, etc., affect the crossing positions and zero-crossings of the detection signals. Then, the gradients of line segments of the respective subdivision signals may not be constant. As used herein, normalization means a correction of uniformizing the gradients of line segments of the subdivision signals.

FIG. 14 will be taken as an example. Against a true angle value of 60 [deg], the estimated angle is at x1, i.e., about 40 [deg]. Against a true angle value of 120 [deg], the estimated angle is at x2, i.e., about 100 [deg]. In the example shown in FIG. 14, the gradient of the line segment g311 between true angle values from 0 [deg] to 60 [deg] is different from the gradient of the line segment g312 between true angle values from 60 [deg] to 120 [deg].

If the line segments of the detection signals have different gradients, when the subdivision signal sg311 and the subdivision signal sg312 are joined and a mechanical angle is determined from the gradient of the joined line segments, differing gradients in the line segment may cause an error in the result of position estimation.

Therefore, in the present embodiment, the subdivision signals are normalized to reduce errors in the result of position estimation.

Figure 17:
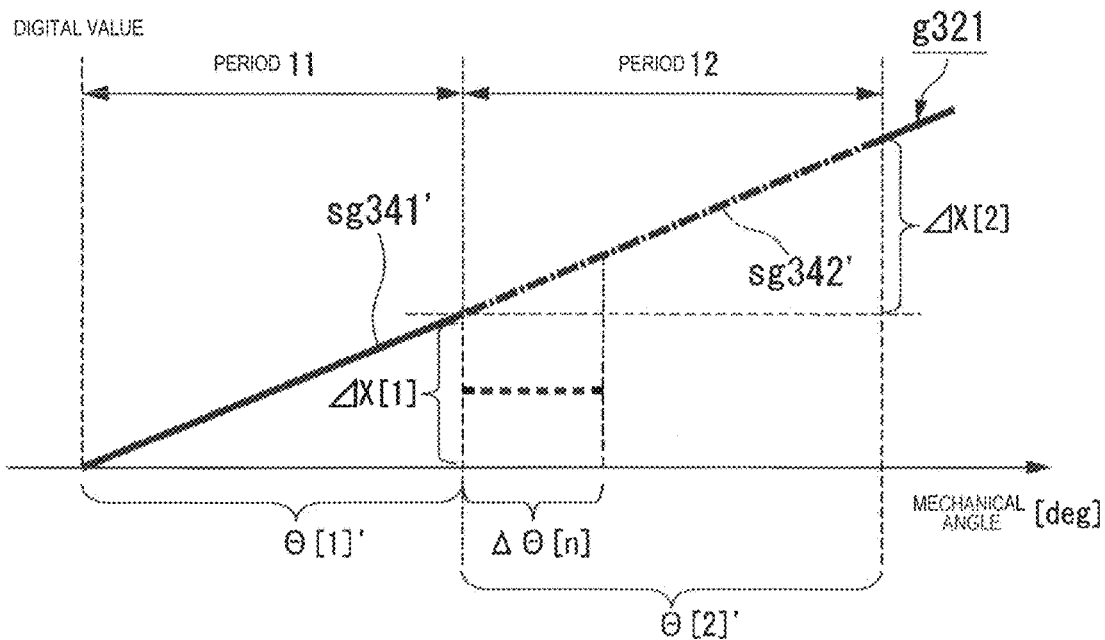
FIG. 17 A diagram explaining normalization of subdivision signals according to a third embodiment.

FIG. 17 is a diagram explaining normalization of subdivision signals according to the present embodiment. In FIG. 17, the horizontal axis represents the mechanical angle [deg]; the vertical axis represents the digital value. In FIG. 17, only two subdivision signals are shown for simplicity of description.

The waveform indicated by numeral g321 in FIG. 17 is a waveform in which the subdivision signal sg341' and the subdivision signal sg342' are joined together. The mechanical angle of the subdivision signal sg341' is Θ[1]'. The subdivision signal sg341' has a digital value of ΔX[1]. The subdivision signal sg342' has a mechanical angle of Θ[2]'. The subdivision signal sg342' has a digital value of ΔX[2].

By using a normalization coefficient k[i] for each segment and a digital value ΔX[i] for each subdivision signal that are stored in the storage section 33B, the normalization section 325 calculates a mechanical angle Θ[i]' according to equation (12) below. Note that i is the ordinal number of a segment, being an integer from 1 to 72.

$$\Theta[i]' = \Delta X[i] \times k[i] \tag{12}$$

The normalization section 325 calculates a deviation ΔΘ[n] of a mechanical angle at the current point in time from a crossing position or zero-crossing which was stored in the previous run as shown in FIG. 17, by using equation (13) below.

$$\Delta\Theta[n] = X[n] \times k[i] \tag{13}$$

In equation (13), n represents an uncertain number at present.

The normalization section 325 multiplies X[n] on the vertical axis of the subdivision signal with a normalization coefficient k[i], and outputs the result of multiplication to the line segment joining section 323.

In the present embodiment, the subdivision signals are normalized before being joined, whereby the gradients of the line segments of the subdivision signals can be essentially uniformized. As a result, according to the present embodiment, the precision of position detection can be further improved even if there is variation in the precision with which the detection sections are attached or there is variation among the signals from the detection sections.

<Calculation of Normalization Coefficient k[i] Via Offline Processing>

Now, a method of calculating the normalization coefficient k[i] in the above equation (13) via offline processing will be described. Offline processing is a process(es) to be performed in advance of shipment, or a process(es) to be performed before the motor controlling system 1B is actually used, for example. Calculating the normalization coefficient via online processing will increase the calculation load on the position calculating section 32B. Therefore, the normalization section 325 may calculate the normalization coefficient via offline processing and have it stored in the storage section 33B. The following processes are to be performed while the motor controlling system 1B rotates the rotor R at a constant rotational speed, in accordance with a command position value Θ* from the external device 70.

Figure 18:
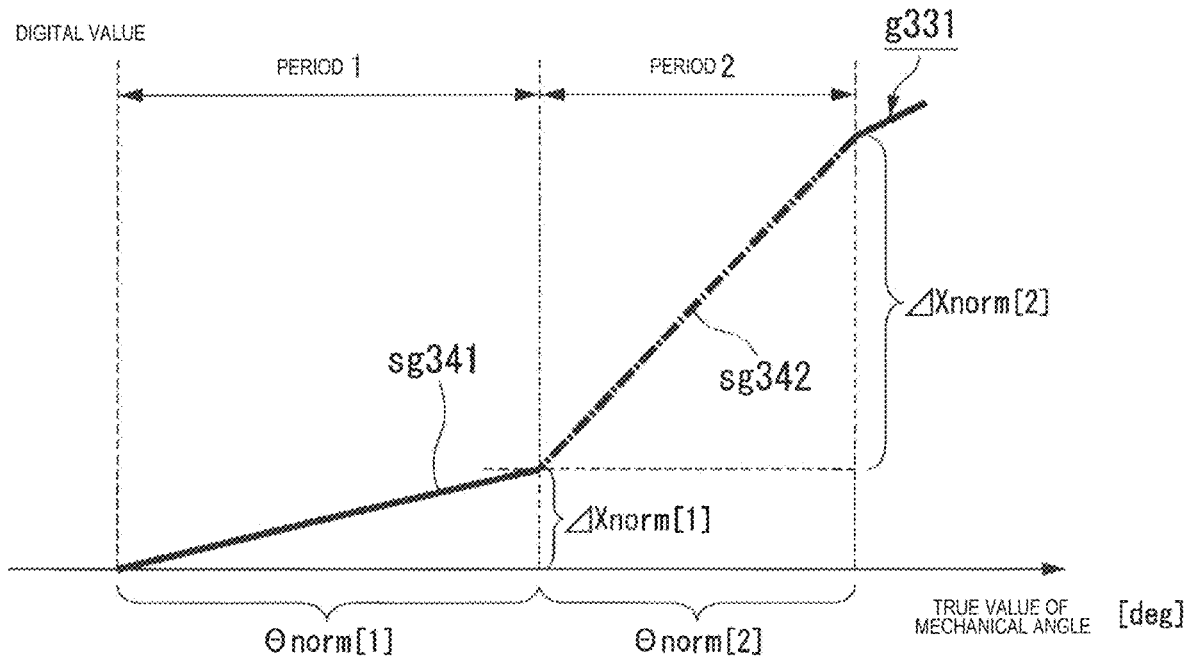
FIG. 18 A diagram explaining calculation of a normalization coefficient according to the third embodiment.

FIG. 18 is a diagram explaining calculation of a normalization coefficient according to the present embodiment. The signal shown in FIG. 18 indicates values of subdivision signals determined via offline processing. In FIG. 18, the horizontal axis represents the true value of mechanical angle [deg]; the vertical axis represents the digital value. In FIG. 18, only two subdivision signals are shown for simplicity of description.

While the motor M is rotating at a predetermined number of revolutions, the normalization section 325 measures an elapsed time t[i] from a crossing to a zero-crossing for each subdivision signal worth one cycle of mechanical angle, and a deviation ΔXnorm[i], in digital value, from a crossing to a zero-crossing for each subdivision signal worth one cycle of mechanical angle.

Next, from the respective measured elapsed time for each subdivision signal, the normalization section 325 calculates a true value Θnorm[i] of mechanical angle by using equation (14) below.

$$\Theta\text{norm}[i] = \{t[i]/(t[1] + \ldots + t[72])\} \times 360 [\text{deg}] \tag{14}$$

In equation (14), i is the ordinal number of a segment, being an integer from 1 to 72.

The waveform indicated by numeral g331 in FIG. 18 is a waveform in which a subdivision signal sg341 and a subdivision signal sg342 are joined together. The true value of mechanical angle of the subdivision signal sg341 is Θnorm[1]. The digital value of the subdivision signal sg341 is ΔXnorm[1].

For each subdivision signal, i.e., for each segment, the normalization section 325 calculates a normalization coefficient k[i] based on equation (15) below, by using the true value Θnorm[i] of mechanical angle determined by equation (14). The calculated normalization coefficient k[i] is stored to the storage section 33B.

$$k[i] = \Theta\text{norm}[i]/\Delta X\text{norm}[i] \tag{15}$$

Thus, by performing offline processing, a normalization coefficient k[i] as determined from equation (15) can be calculated. As described above, this normalization coefficient k[i] is used to derive the mechanical angle Θ[i]' equation (12) or ΔΘ[n] equation (13) on-line. This makes it possible to estimate a mechanical position in which variation among the gradients of the line segments of the subdivision signals is corrected. In other words, one implementation of a method of position estimation according to the present invention involves: a measurement step in which, while the mover is rotating at a predetermined number of revolutions, the normalization section measures a duration of each subdivision signal, a duration required for the mover to make one round, and a signal value increment in the duration of each subdivision signal or a line segment length of the subdivision signal; a mechanical angle calculation step in which the normalization section calculates a mechanical angle for each subdivision signal based on the duration of each subdivision signal as measured by the measurement step and on the duration required for the mover to make one round; a normalization coefficient calculation step in which the normalization section calculates a normalization coefficient for each subdivision signal by dividing the mechanical angle calculated by the mechanical angle calculation step with the signal value or the line segment length as measured by the measurement step; and a normalization step in which the normalization section corrects the mechanical angle through a normalization by multiplying, for each subdivision signal, the normalization coefficient calculated by the normalization coefficient calculation step with the signal value or line segment length of a newly detected subdivision signal.

<Calculation of ΘOffset[i] Via Offline Processing>

Figure 19:
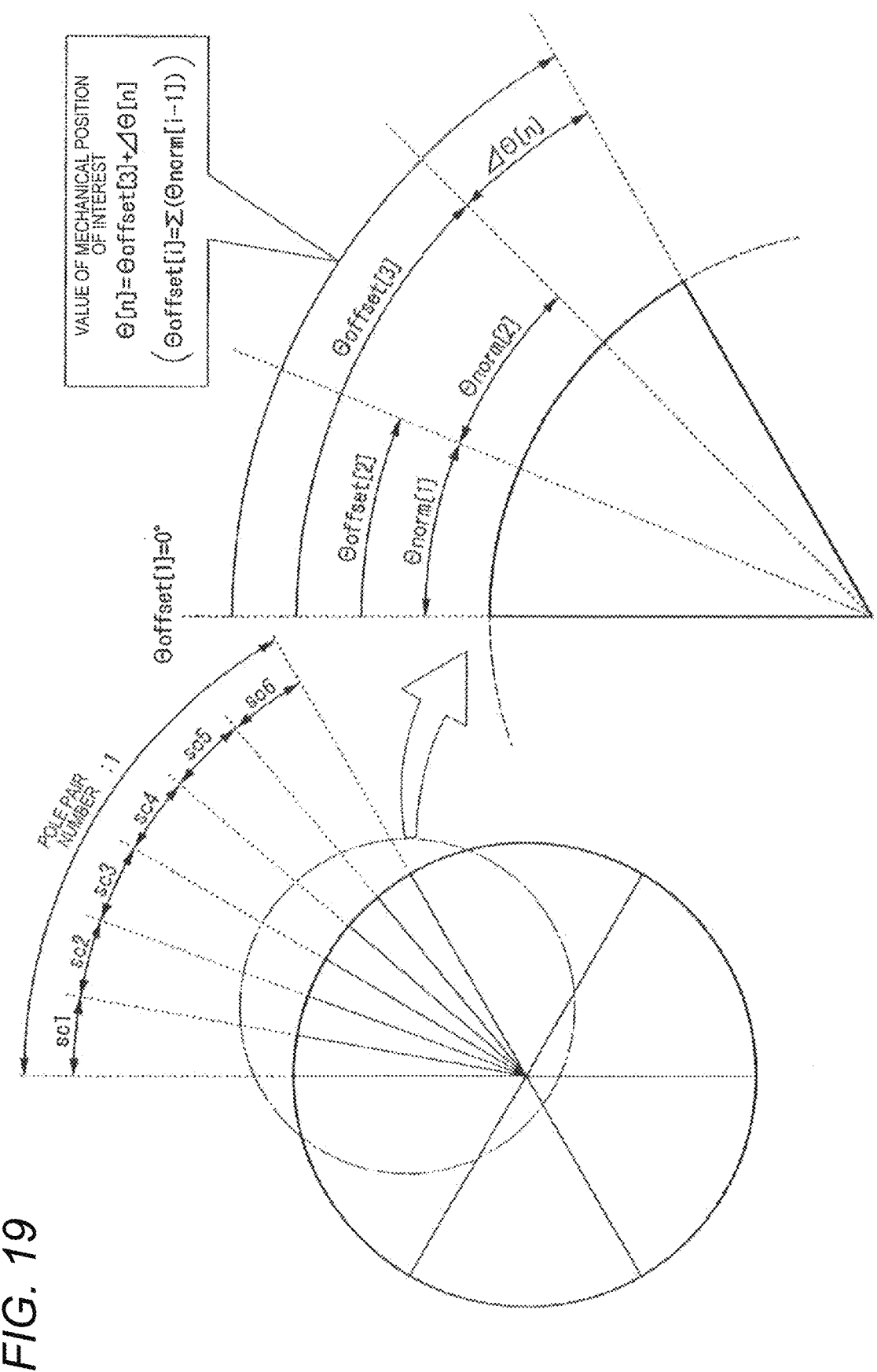
FIG. 19 A diagram describing calculation of a mechanical angle according to the third embodiment.

FIG. 19 is a diagram describing calculation of a mechanical angle position according to the present embodiment. The example shown in FIG. 19 provides an explanatory diagram with respect to pole pair number 1.

In FIG. 19, let the mechanical position of interest be a position at ΔΘ[n] from a section sc2. ΔΘ[n] is an angle of the rotor R from an immediately previous crossing or zero-crossing position to the current point in time n.

The position at which the mechanical position takes an angle 0 [degM] is designated as Θoffset[1]. The position at Θnorm[1] therefrom is designated as Θoffset[2]. A position at Θnorm[2] from the position at which the mechanical position takes 0 [degM] is designated as Θoffset[3]. Accordingly, a position at Θnorm[i] from the position at which the mechanical position takes 0 [degM] is designated as Θoffset[i]. Θoffset[i] is expressed by equation (16) below.

$$\Theta \text{offset}[i] = \Sigma(\Theta \text{norm}[i-1]) \qquad (16)$$

Note that i=1 to 72, Θnorm[0]=0.

Herein, the Θoffset[i] calculated via offline processing is allowed to be retained in the storage section 33B.

<Calculation of Mechanical Angle Θ[n]>

Therefore, the current position, i.e., the mechanical angle Θ[n] of the rotor R at the current point in time, is expressed by equation (17) below.

$$\Theta[n] = \Theta \text{offset}[i] + X[n] \times k[i] \qquad (17)$$
$$= \Theta \text{offset}[i] + \Delta\Theta[n]$$

As indicated by equation (17), Θoffset[i] is retrieved from the storage section 33B when calculating the mechanical angle Θ[n] of the rotor R at the current point in time.

Now, online-processing calculation of the mechanical angle Θ[n] of the rotor R at the current point in time will be considered. In some cases, the mechanical angle position indicated by Θoffset[i] as calculated via online processing may differ from the mechanical angle position of Θoffset[i] as calculated via offline processing. This error is a calculation error in the mechanical angle Θ[n] of the rotor R at the current point in time. Owing to this error, after the rotor R has rotated by one cycle of mechanical angle, it may not return to the same mechanical angle position.

Therefore, Θoffset[i] as calculated via offline processing is used. As indicated by equation (17), ΔΘ[n] is calculated on the basis of the mechanical angle position up to the crossing position or zero-crossing immediately previous to ΔΘ[n]. With this method, ΔΘ[n] can be calculated without being affected by an accumulation of errors occurring in the periods preceding Θoffset[i]. In other words, in the mechanical angle calculation step, the normalization section calculates a current mechanical angle by, during a period which is required for the mover to make one round, adding a mechanical angle which has been corrected through the normalization step to the mechanical angle from a newly detected immediately previous subdivision signal.

In the present specification, any data that is acquired through the above-described offline processing is referred to as "measurement data". The measurement data is data in which a moved amount of the mover corresponding to each segment is associated with every segment. When the number of segments is 72, for each of Segments 1 through 72, a mechanical angle acquired through measurement (i.e., a true value of mechanical angle from the start point to the end point of the segment) may be assigned. Such measurement data may be stored and retained as an information table, for example, in the storage section 33, 33A, or 33B. By referring to the measurement data which is read from the storage section 33, 33A, or 33B, it is possible to read, from the ordinal number of a segment, the mechanical angle of the segment which is designated by that ordinal number, or any other information associated with that mechanical angle.

For example, assume that it has been ascertained via offline processing that Segment 1, Segment 2, . . . , and Segment 72 have mechanical angles of 4.1 degrees, 4.9 degrees, . . . , and 5.3 degrees, respectively. It is assumed that the measurement data thus obtained is stored in a storage device in the form of a table. In this case, from the ordinal number of the detected segment, a mechanical angle (true value) corresponding to that segment can be obtained by referring to the measurement data. Such a sequence of mechanical angle values is unique to each motor, and may serve as a so-called "fingerprint" of the motor.

Measurement data is typically retained in the storage section prior to shipment, but may be updated later on. It may be possible for the value of the normalization coefficient k[i] as learned via offline processing to undergo chronological changes. Therefore, offline processing may be performed regularly or irregularly, in order to reacquire measurement data.

Note that measurement data may be collected via the Internet or other telecommunication lines, and stored to a storage apparatus in the cloud. When the measurement data is updated as described above, the measurement data in the storage apparatus in the cloud is also updated. Based on the content of the updated measurement data, it is also possible to diagnose the motor M.

<Identification of Mechanical Position>

Next, a method of identifying an initial mechanical position will be described.

The operation of the motor controlling system 1 according to the present embodiment includes a storage step, a section determination step, an error calculation step, an evaluation step, a position identification step, and a determination step. After reactivation of power, the information of segment i becomes initialized; therefore, a normalization coefficient k[i] which was learned via offline processing would not be properly applicable. Therefore, after reactivation of power, it is necessary to identify the mechanical position (segment or pole pair number). Herein, a segment or pole pair number is expressed by the equation: ordinal number of segment=12×pole pair number+ordinal number of section. Thus, by identifying a pole pair number, it is possible to identify an ordinal number of the segment (mechanical position).

Figure 20:
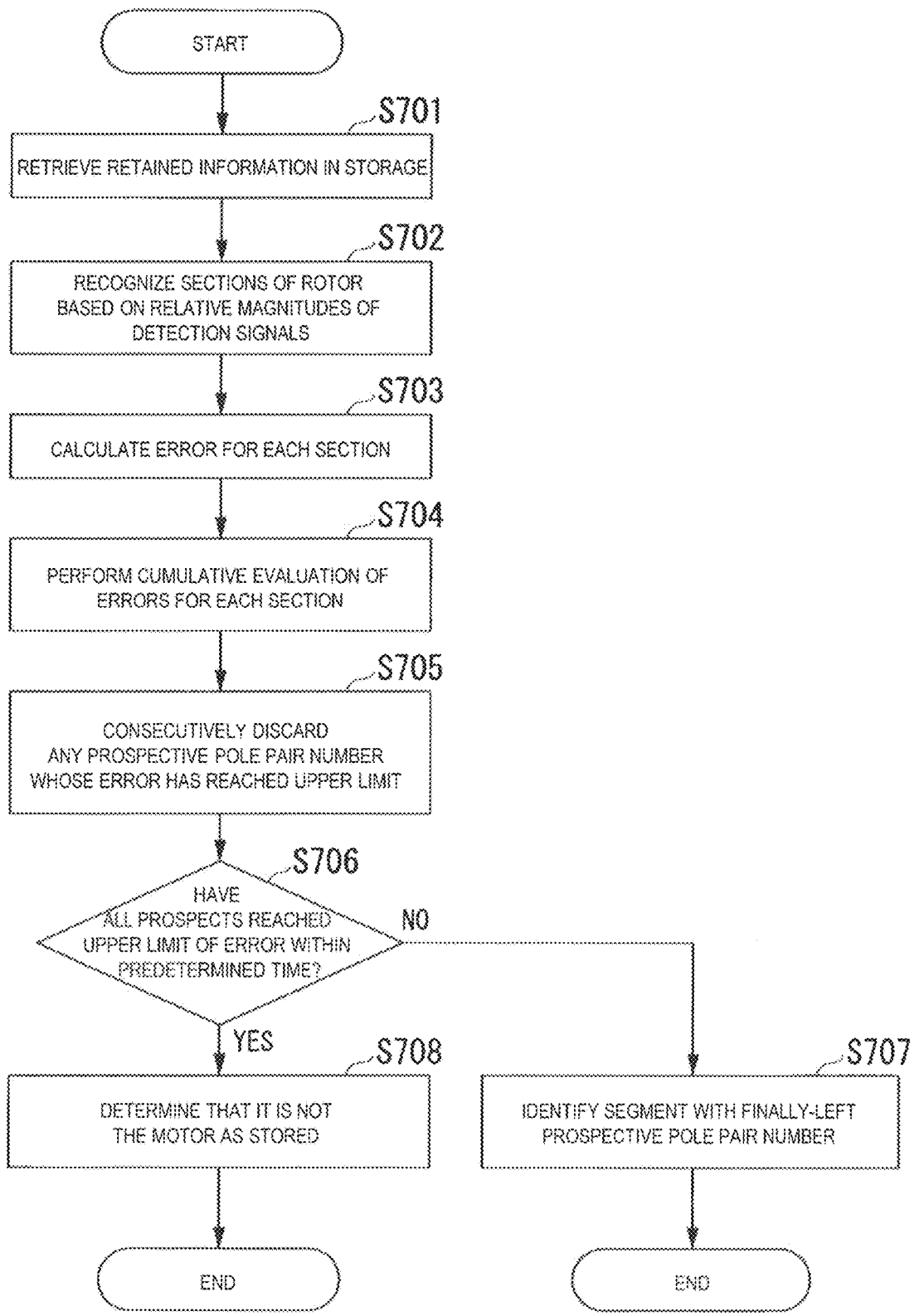
FIG. 20 A flowchart of a procedure of an initial position estimation process for the rotor R according to the third embodiment.

FIG. 20 is a flowchart of a procedure of an initial position identification process for the rotor R according to the present embodiment.

(step S701) At shipment of the motor M or of a product incorporating the motor M, the normalization section 325 causes the storage section 33B to sequentially store a true value Θnorm[i] of mechanical angle for each subdivision signal when the rotor R is rotated at a constant velocity. After reactivation of power, the retained information which is stored in the storage section 33B is retrieved from a flash ROM into a RAM. In this manner, the normalization section 325 performs learning by causing the storage section 33B to sequentially store a true value Θnorm[i] of mechanical angle for each subdivision signal when the rotor R is rotated at a constant velocity.

(step S702) Based on the relative magnitudes of the detection signals Hu0', Hv0' and Hw0' as stored in the storage section 33B, the position estimation section 30B determines the ordinal numbers of sections of the rotor R.

(step S703) For each section, the position estimation section 30B calculates an error between a true value of mechanical angle Θnorm[i] and a mechanical angle Θ[i].

(step S704) The position estimation section 30B performs cumulative evaluation of the errors calculated at step S703.

(step S705) The position estimation section 30B consecutively discards any prospective pole pair number (segment) whose error has reached an upper limit.

(step S706) The position estimation section 30B determines whether all prospects have reached the upper limit of error within a predetermined time. When determining that not all prospects have reached the upper limit of error within the predetermined time (step S706; NO), the position estimation section 30B proceeds to the process of step S707. When determining that all prospects have reached the upper limit of error within the predetermined time (step S706; YES), the position estimation section 30B proceeds to the process of step S708.

(step S707) By identifying a segment from the finally-left prospective pole pair number (segment), an initial position of the rotor R is identified. Then, the process of identifying the ordinal numbers of segments is ended.

(step S708) Based on a detection signal received, the position estimation section 30B determines that it is not the motor M for which normalization has been performed.

Thus, the process of identifying of an initial position of the rotor R is ended. At (step S701), the retained information that is stored in the storage section 33B is not limited to a true value Θnorm[i] of mechanical angle. For example, a digital value for each subdivision signal or a line segment length for each subdivision signal, etc., may be stored in the storage section 33B. The retained information to be stored in the storage section 33B may include normalization coefficients k[i], correction equations (1) through (3), (6) through (11), correction equations for use in the third correction, positive gain correction values, negative gain correction values, an offset correction value for each phase, and predesigned values. In other words, the storage step of (step S701) causes retained information which has been calculated through the measurement step or the mechanical angle calculation step to be stored to the storage section 33B in advance. The error calculation step of (step S703) is not limited to the case of calculating an error between a true value Θnorm[i] of mechanical angle and a mechanical angle Θ[i]. For example, it may be between a digital value for each subdivision signal or a line segment length for each subdivision signal in the retained information and a digital value for each subdivision signal or a line segment length for each subdivision signal from online processing. Thus, with the method of position estimation according to the present embodiment, by storing a mechanical angle and a normalization coefficient for each subdivision signal in the storage section 33B, it becomes possible to identify a current mechanical position even after power reactivation. Moreover, with the method of position estimation according to the present embodiment, if all prospects have reached the upper limit of error within a predetermined time, it can be determined that the detection signal does not pertain to the motor M for which normalization has been performed.

In the present embodiment, the position calculating section 32B may further include a correction section 324 as described in the second embodiment. As a result, the precision of position detection can be further improved.

The position calculating section 32B or position calculating section 32A which further includes the correction section 324 may be adapted so that the information to be stored in the storage section 33B is acquired and learned during offline processing and then is stored to the storage section 33B or the storage section 33A. Herein, the retained information to be stored in the storage section 33B or the storage section 33A is correction equations (1) through (3), (6) through (11), correction equations for use in the third correction, positive gain correction values, negative gain correction values, an offset correction value for each phase, and predesigned values.

For example, if the correction values for use in the second correction are to be calculated via online processing, the calculation load on the position calculating section 32 will increase. Therefore, the second correction section 3242 may calculate correction values to be used in the second correction via offline processing, and have them stored in the storage section 33A. In the case where the storage section 33 is composed of a flash ROM and a RAM, for example, the second correction section 3242 may move the correction values stored in the flash ROM to the RAM for use as the position calculating section 32 is powered on. As for the correction values in the third correction, too, the third correction section 3243 may have them stored in the storage section 33 via offline processing.

In each embodiment of the present invention, the reference value has been described as a value which exhibits a digital value of 0; however, this is not a limitation. For example, in the case where detection signals do not undergo AD conversion and the present invention is carried out based on analog signals, the reference value does not need to be a value exhibiting 0. Even in the case of employing digital signals, the reference value may not be 0.

In each embodiment of the present invention, a crossing position, a zero-crossing, and a subdivision signal being "detected" implies that a crossing position and a zero-crossing are detected as a result of calculating a crossing position, a zero-crossing, and a subdivision signal in the position estimation section.

Note that a program for realizing the functions of the position estimation section (30, 30A, 30B) in each embodiment of the present invention may be recorded on a computer-readable storage medium not shown, and the program record on this storage medium may be loaded to a computer system for execution, thereby carrying out the procedure of each process. As used herein, a "computer system" encompasses an OS and any hardware such as peripheral devices. Moreover, a "computer system" also encompasses a WWW system that is complete with a website-presenting environment (or -displaying environment). A "computer-readable storage medium" means a portable medium such as a flexible disk, a magneto-optical disk, a ROM, or a CD-ROM, as well as a storage device such as a hard disk that is internalized in a computer system. Furthermore, a "computer-readable storage medium" encompasses that which retains a program for a certain period of time, e.g., a volatile memory (RAM) inside a computer system that serves as a server or a client when a program is transmitted via a network such as the Internet or a telecommunication lines such as a telephone circuit.

Moreover, the aforementioned program may be transmitted from a computer system having this program stored in a storage device or the like to another computer system, via a transmission medium or by a propagating wave within a transmission medium. As used herein, a "transmission medium" with which to transmit the program means a medium having the function of transmitting information, e.g., a network (communications network) such as the Internet, or telecommunication lines (communication lines) such as a telephone circuit. The aforementioned program may be adapted to realize some of the aforementioned functions. It may also be something that realizes the aforementioned functions in combination with a program that is already recorded within the computer system, i.e., a so-called difference file (difference program).

Fourth Embodiment

Typical example of the sensors 11 to 13 in the above-described embodiments are Hall generators, as mentioned earlier. A Hall generator is a sensor (magnetic sensor) that detects a magnetic field by utilizing the Hall effect. The Hall effect is a phenomenon where, in the presence of a magnetic field having a component which is perpendicular to an electric current flowing through a substance such as a semiconductor, an electromotive force occurs in a direction which is orthogonal to both the electric current and the magnetic field. A commonly-used Hall generator includes two terminal pairs. While an electric current is flowing through a first terminal pair, a voltage that occurs in a second terminal pair owing to the Hall effect is measured. Sensors utilizing the Hall effect include Hall generators, Hall ICs, and linear Hall ICs. Herein, the Hall generator will be described.

Figure 21:
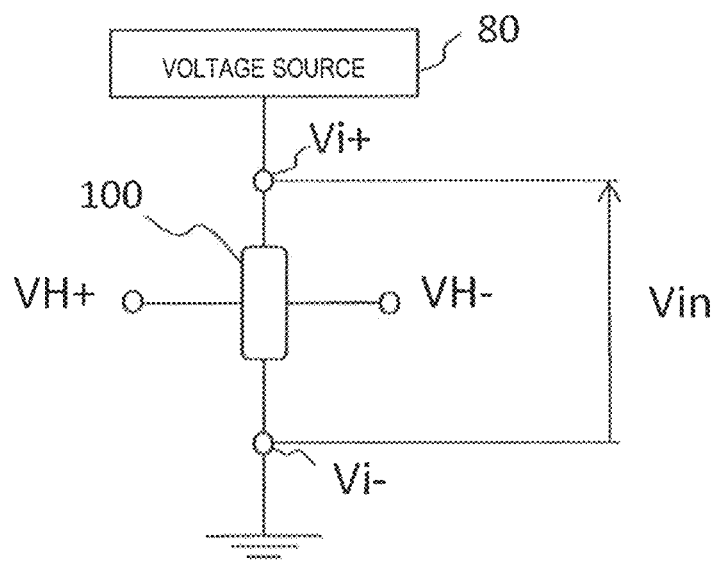
FIG. 21 A circuit diagram of a Hall generator 100.

FIG. 21 is a circuit diagram of a Hall generator 100. In this example, a constant voltage Vin is applied to a first terminal pair Vi+, Vi− of the Hall generator 100 by a voltage source 80, whereby an electric current flows in the vertical direction in the figure. When a magnetic field is externally applied to the electric current flowing inside the Hall generator 100, a voltage occurs across a second terminal pair VH+, VH− of the Hall generator 100. When the applied voltage Vin is constant, i.e., under constant-voltage operation, this voltage (output voltage) is in proportion to the intensity of the magnetic field. Therefore, it is possible to detect the intensity of a magnetic field based on the output voltage of the Hall generator 100.

Figure 22:
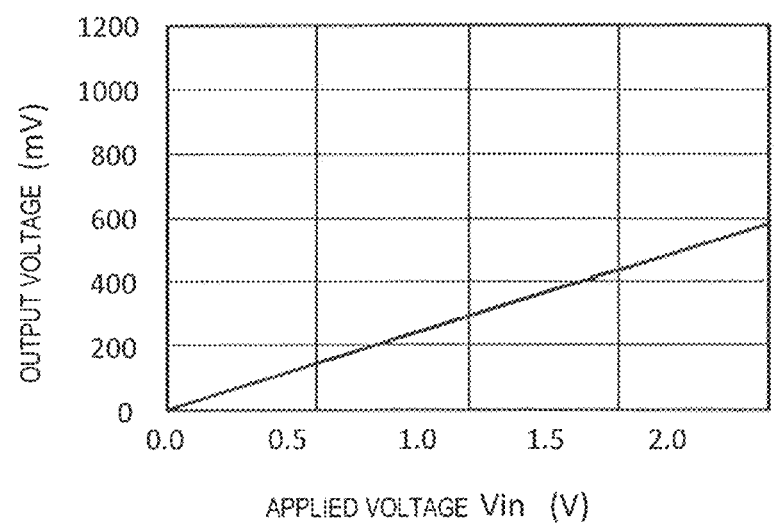
FIG. 22 A graph showing an exemplary relationship between the output voltage and the applied voltage Vin of a Hall generator 100 under a constant magnetic field.

FIG. 22 is a graph showing an exemplary relationship between the output voltage and the applied voltage Vin of the Hall generator 100 under a constant magnetic field. As is clear from FIG. 22, the output voltage of the Hall generator 100 varies in proportion to the applied voltage Vin, even though the magnetic field may have a constant magnitude. When the Hall generator 100 is operating under a constant voltage, the output voltage has hardly any ambient temperature dependence.

Figure 23:
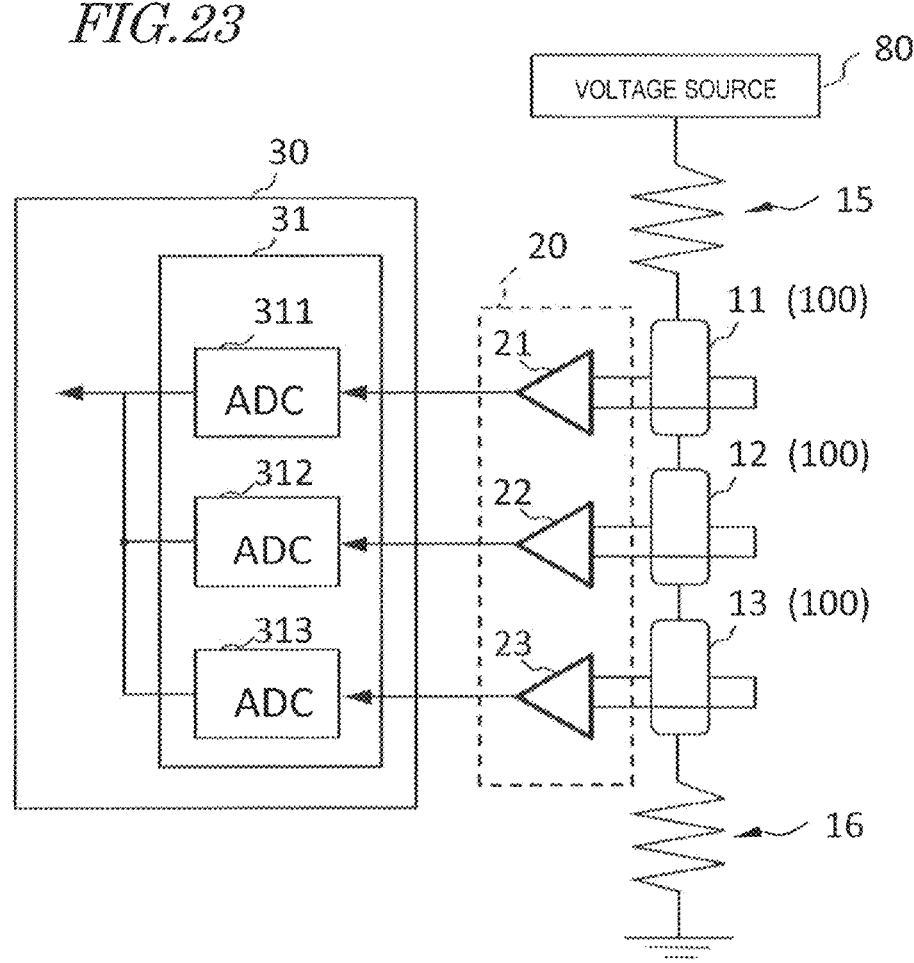
FIG. 23 A circuit diagram showing an exemplary construction in which three sensors 11 to 13 are implemented by three Hall generators.

FIG. 23 is a circuit diagram showing an exemplary construction in which three sensors 11 to 13 in the above aforementioned embodiments are implemented by three Hall generators. The sensors 11 to 13, each of which is a Hall generator, are in series connection between a voltage source 80 and ground, via resistors 15 and 16. The resistors 15 and 16 function to prevent voltage clipping.

Figure 24:
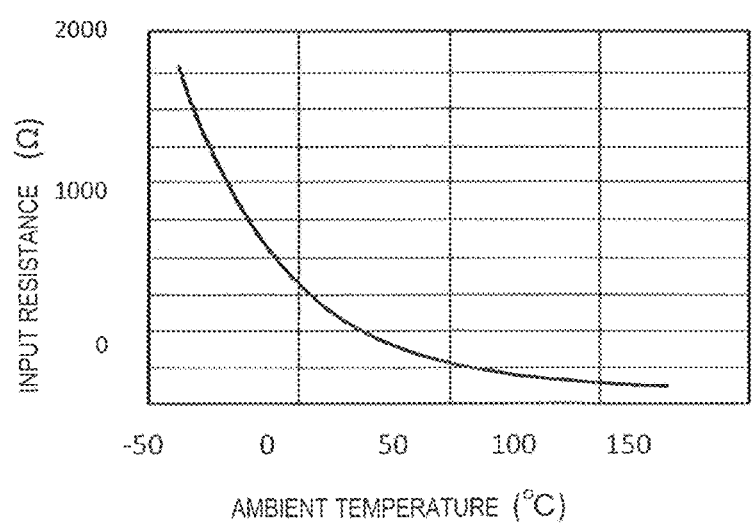
FIG. 24 A diagram showing exemplary temperature characteristics of the Hall generator 100.

According to a study by the present inventors, the output voltage of a Hall generator under constant-voltage operation, which is originally unlikely to be affected by ambient temperature, may fluctuate with respect to ambient temperature in accordance with the circuit of FIG. 23. The cause for this fluctuation is the temperature dependence of the resistance values of the resistors 15 and 16, and the temperature dependence of the resistance values of the Hall generators 100. More specifically, the resistance values of the resistors 15 and 16 increase with an increase in ambient temperature, the resistor 15 having a positive temperature coefficient. On the other hand, as shown in FIG. 24, the resistance values of the Hall generators 100 decrease with an increase in ambient temperature, the Hall generators 100 having a negative temperature coefficient.

Figure 25:
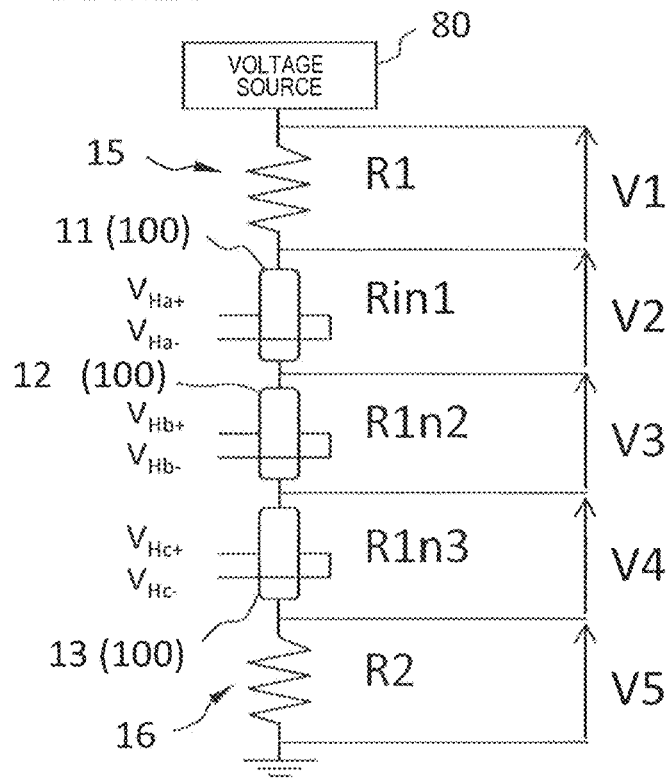
FIG. 25 A diagram showing resistance values R1, Rin1, Rin2, Rin3 and R2 of a resistor 15, a sensor 11, a sensor 12, a sensor 13, and a resistor 16.

As shown in FIG. 25, the resistor 15, the sensor 11, the sensor 12, the sensor 13, and the resistor 16 have resistance values R1, Rin1, Rin2, Rin3 and R2, respectively. Moreover, voltages V1, V2, V3, V4 and V5 are applied to the resistor 15, the sensor 11, the sensor 12, the sensor 13, and the resistor 16, respectively. As mentioned above, when the ambient temperature increases, the resistance values R1 and R2 increase, but the resistance values Rin1, Rin2 and Rin3 decrease. Applied voltages to the respective elements are divided in accordance with their resistance ratio. Therefore, when the ambient temperature increases, even if the voltage source 80 has a constant voltage, the voltages V1 and V5 will become high, and the voltages V2, V3 and V4 will become low. The voltages V2, V3 and V4 are respective applied voltages to the three Hall generators 100. As has been described with reference to FIG. 22, lowering of the applied voltage of a Hall generator 100 results in lowering of its output voltage, even if the applied magnetic field may be the same.

As will be seen from the above description, with the circuit construction of FIG. 23, when the ambient temperature increases, the applied voltages of the Hall generators 100 become lower, whereby the signals Hu0, Hv0 and Hw0 shown in FIG. 3 decrease in amplitude. On the other hand, when the ambient temperature decreases, the applied voltages of the Hall generators 100 become higher, whereby the signals Hu0, Hv0 and Hw0 in FIG. 3 increase in amplitude.

If the ambient temperature during operation has changed from the ambient temperature during offline learning, using the measurement data as it is may cause an error in an estimated position value of the mover.

In the present embodiment, in order to reduce or eliminate the aforementioned error, a construction is provided for correcting changes in the amplitudes of the signals Hu0, Hv0 and Hw0 that may occur with changes in changes in ambient temperature. Hereinafter, an example of this construction will be described.

Figure 26:
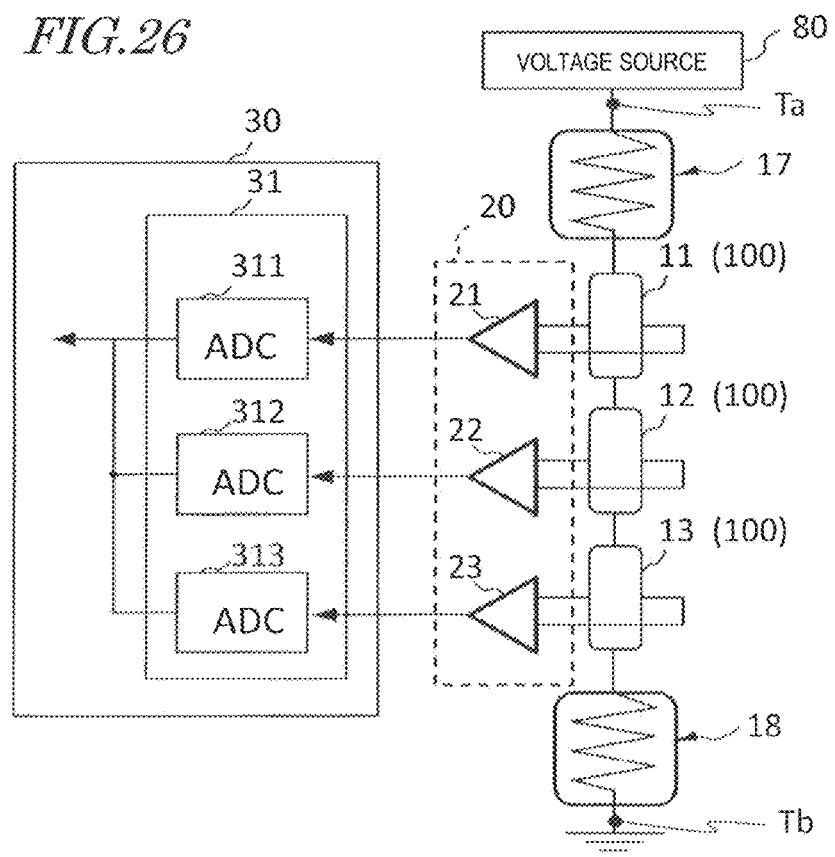
FIG. 26 A circuit diagram showing an exemplary circuit construction of Hall generators 100 according to a fourth embodiment.

FIG. 26 is a circuit diagram showing an exemplary circuit construction of Hall generators 100 according to the present embodiment. In the present embodiment, sensors 11 to 13, each of which is a Hall generator 100, are in series connection between a terminal Ta of the voltage source 80 and a terminal Tb which is at the same potential as ground, via thermistors 17 and 18. The terminals Ta and Tb supply voltage to the thermistor 17, the sensors 11 to 13, and the thermistor 18 which are in series connection. The thermistors 17 and 18 serve similar roles to those of the aforementioned resistors 15 and 16 in that they function to prevent voltage clipping. One difference is that the resistances of the thermistors 17 and 18 decrease with an increase in ambient temperature, and the thermistors 17 and have temperature coefficients with the same polarity (negative) as that of the Hall generators 100. As a result, changes in applied voltage due to changes in ambient temperature are suppressed.

Generally speaking, the resistance value R of a Hall generator is approximated by the following equation (see FIG. 24).

$$R = R0 \times \exp\{B(1/T - 1/T0)\}$$

In the above, exp denotes an exponential function, R0 and B are constants, T denotes a current temperature, and T0 denotes a reference temperature. The temperatures are in units of absolute temperature. The size of "B", which is a coefficient for 1/T, is referred to as the "B constant". Preferably, the thermistors 17 and 18 have similar temperature characteristics to the temperature characteristics expressed by the above approximate expression.

Instead of the thermistors 17 and 18, Hall generators 100 may be utilized as the resistor elements for voltage clipping prevention. In this case, the Hall generators to be used as the resistor elements have a "B constant" of the same size as those of the Hall generators that are used as the sensors 11 to 13, and therefore changes in applied voltage due to changes in ambient temperature can be suppressed.

Fifth Embodiment

Figure 27:
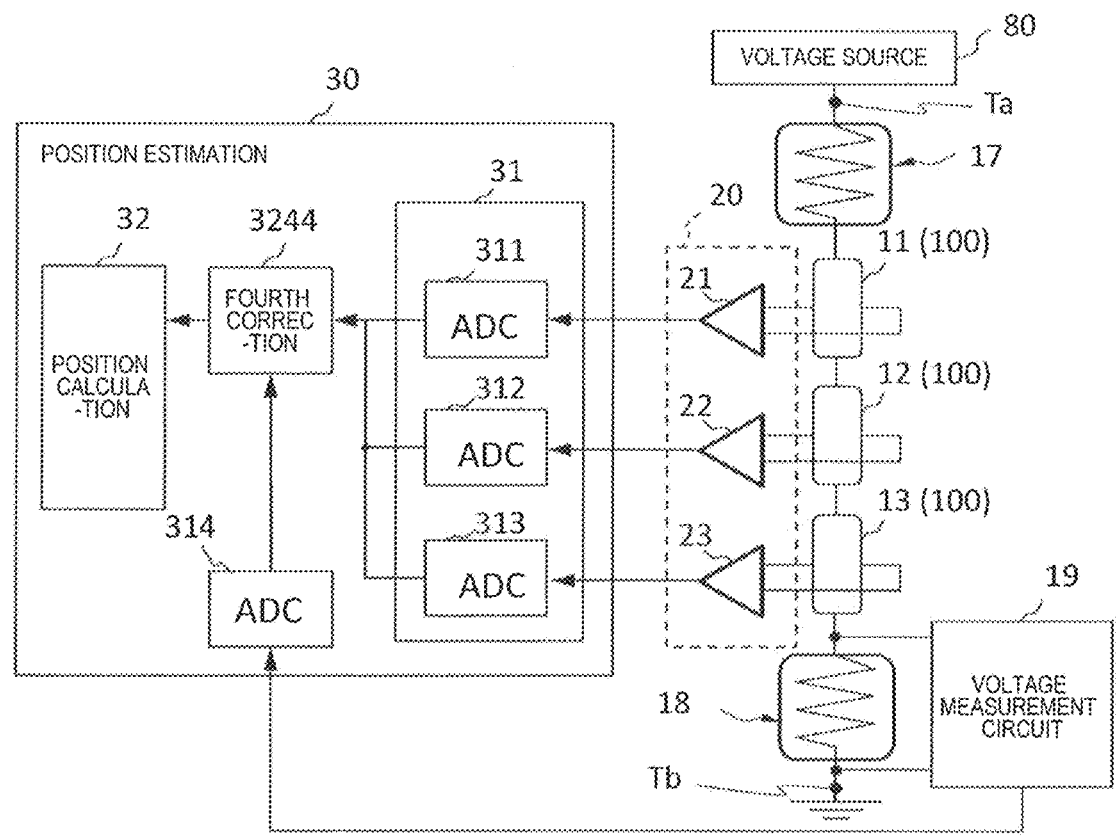
FIG. 27 A circuit diagram showing an exemplary construction according to a fifth embodiment which, when the output of a Hall generator changes due to changes in ambient temperature, corrects for that change.

The present embodiment has a construction which, even if the output of a Hall generator changes due to changes in ambient temperature, compensates for that change. FIG. 27 is a circuit diagram showing a main portion of the construction according to the present embodiment. The present embodiment includes a voltage measurement circuit 19 which measures a voltage across the lower thermistor 18. The output of the voltage measurement circuit 19 is input to an AD conversion circuit (ADC) 314 in the position estimation section 30 in real time. A signal (digital value) which is output from the AD conversion circuit 314 indicates the voltage across the thermistor 18. Based on the voltage across the thermistor 18, the position estimation section 30 calculates an applied voltage to each Hall generator 100. Since the relationship (see FIG. 24) between the applied voltage to the Hall generator 100 and the output voltage is known, a fourth correction section 3244 is able to correct the amplitudes of the detection signals Hu0', Hv0' and Hw0' based on the applied voltages to the Hall generators 100. Specifically, let it be assumed that an increase in ambient temperature has made the uncorrected amplitudes of the current detection signals Hu0', Hv0' and Hw0' as low as e.g. 50% magnitudes of the amplitudes of detection signals Hu0', Hv0' and Hw0' as obtained from offline learning. In this case, the detected voltage across the thermistor 18 must have increased from the voltage as obtained from offline learning. Based on the current measured voltage across the thermistor 18, the fourth correction section 3244 converts the uncorrected amplitudes of the current detection signals Hu0', Hv0' and Hw0' to corrected values which are twice as large, and inputs them to the position calculating section 32. For example, in the case of the embodiment shown in FIG. 8, the detection signals Hu0', Hv0' and Hw0' as corrected by the fourth correction section 3244 are supplied to the correction section 324.

Instead of measuring a voltage across the thermistor 18, a voltage across the upper thermistor 17 may be measured. Moreover, voltages across both thermistors 17 and 18 may be measured. In the case where resistors 15 and 16 are used in the place of the thermistors 15 and 16 (see FIG. 23), the voltage measurement circuit 19 may measure the voltage across at least one of the resistors 15 and 16.

In the present embodiment, a voltage value which is measured by the voltage measurement circuit 19 when conducting offline learning, i.e., when acquiring the measurement data, is stored to the storage section 338 as a reference voltage value. The fourth correction section 3244 functioning as a part of the preprocessing circuit reads the reference voltage value from the storage section 338, and corrects the detection signal based on the current voltage value acquired from the voltage measurement circuit 19 and on the reference voltage value.

Thus, the position estimation device according to the present embodiment includes a voltage detection measurement circuit which detects a voltage value across a resistor element or a detection section, and inputs it to a correction section functioning as the preprocessing circuit. This correction section corrects N detection signals based on the detected voltage values. The method of position estimation performed in the present embodiment includes a temperature compensation step which detects a voltage value across one of the N detection sections or a resistor element, and corrects the detection signal based on the detected voltage value. Thus, even if the output of a sensor such as a Hall generator changes due to changes in ambient temperature, that change can be compensated for.

Sixth Embodiment

Figure 28:
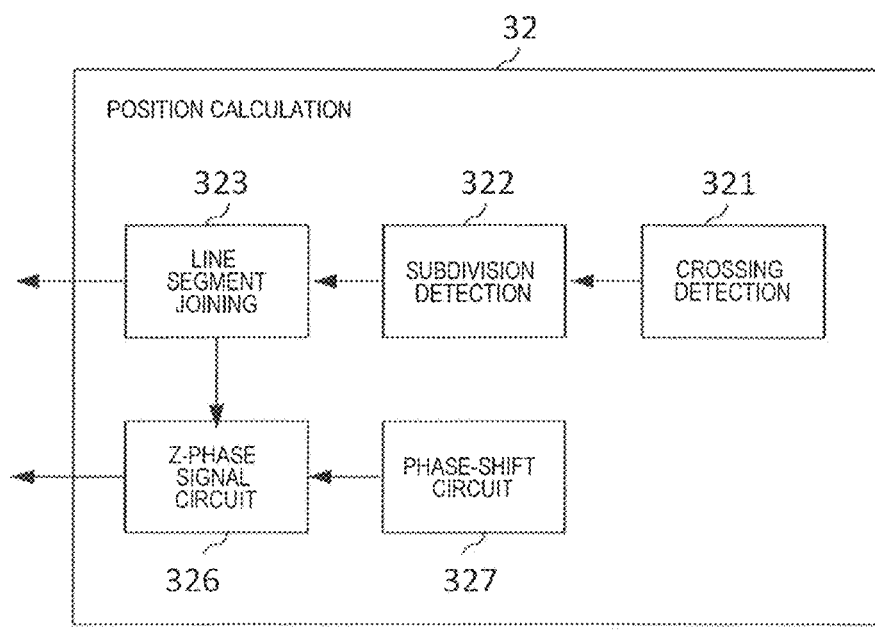
FIG. 28 A schematic diagram showing the construction of a position calculating section 32 according to a sixth embodiment.

According to the present embodiment, in the line segment joining step, the position calculating section 32 generates and outputs a Z-phase signal indicating a reference position of the mover, in synchronization with a detection of one or more specific subdivision signals selected from among the plural subdivision signals having been joined. FIG. 28 is a schematic diagram showing an exemplary construction of the position calculating section 32 according to the present embodiment. In the present embodiment, any other construction that is not shown may be identical to the construction in any of the above-described embodiments.

The position calculating section 32 according to the present embodiment includes a Z-phase signal circuit 326 which, in accordance with the phase of a signal which is output from the line segment joining section 323, generates and outputs a so-called Z-phase signal. A phase-shift circuit 327 is connected to the Z-phase signal circuit 326. The phase-shift circuit 327 adjusts the timing with which the Z-phase signal circuit 326 outputs a Z-phase signal.

Figure 29:
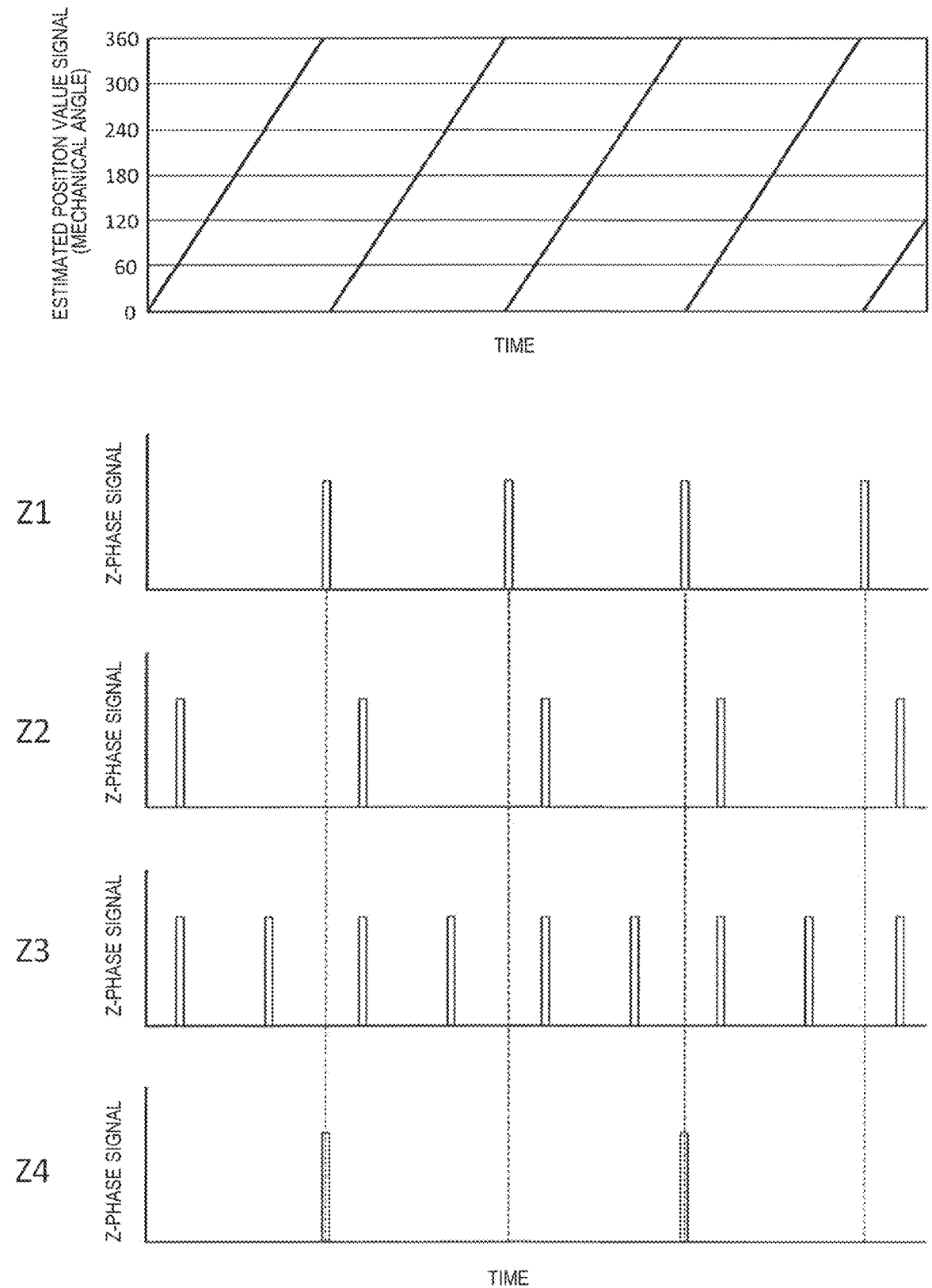
FIG. 29 A diagram showing a waveform of a signal (a signal indicating an estimated position value) which is output from the line segment joining section 323 and exemplary waveforms of a Z-phase signal in each of the above embodiments FIG. 30 A schematic diagram showing the construction of a motor controlling system according to the present embodiment.

FIG. 29 is a diagram showing a waveform of a signal (a signal indicating an estimated position value) which is output from the line segment joining section 323 and exemplary waveforms of a Z-phase signal in each of the above embodiments. As described earlier, a signal which is output from the line segment joining section 323 holds information (absolute mechanical angle information) indicating a mechanical angle Θˆ, which is an estimated value of the mechanical position of the rotor. In the uppermost graph of FIG. 29, the vertical axis represents the estimated mechanical angle Θˆ, and the horizontal axis represents the time. This graph shows a period across which the rotor rotates by 4 turns and 120 degrees in mechanical angle. As is clear from FIG. 29, it is the mechanical angle Θˆ that is determined from the magnitude of this signal, whereby an absolute mechanical position (orientation) of the rotor is unambiguously defined.

FIG. 29 shows various waveform examples of a Z-phase signal which is output from the Z-phase signal circuit 326. Among the examples shown in the figure, a Z1 signal is a pulse signal which goes logic High at every phase where the mechanical angle Θˆ makes 0 degrees with respect to the reference position. A Z2 signal is a pulse signal which goes logic High at every phase where the mechanical angle Θˆ is lagged from the reference position by an arbitrary angle that is designated by the phase-shift circuit 327 in FIG. 28.

In the above example, a pulse signal is output every time the rotor makes one turn in mechanical angle; however, the frequency with which to output the Z-phase signal is not limited to this example. A Z3 signal is a pulse signal which goes logic High at every phase where the mechanical angle Θ^ is lagged behind the reference position by a plurality of angles (less than 360 degrees in mechanical angle) as designated by the phase-shift circuit 327. A Z4 signal is a pulse signal being output so that the mechanical angle Θ^ has a cycle which is greater than 360 degrees with respect to the reference position. In the case where the phase shift angle designated by the phase-shift circuit 327 is greater than 360 degrees in mechanical angle, no pulse signal that is at logic High is output until the mechanical angle Θ^ has increased by the phase shift angle from the reference position.

Thus, according to the present embodiment, without particularly providing an encoder, based on the magnitude of a signal indicating the mechanical angle Θ^, pulse signals can be output at arbitrary phases and with an arbitrary frequency. Such pulse signals can be utilized as Z-phase signals in the conventional meaning, or applied to various other purposes.

Seventh Embodiment

The position estimation sections 30, 30A and 30B according to the above embodiments can be implemented by using a signal processing circuit and a storage medium storing a computer program which controls the operation of this signal processing circuit. Hereinafter, such an embodiment will be described.

Figure 30:
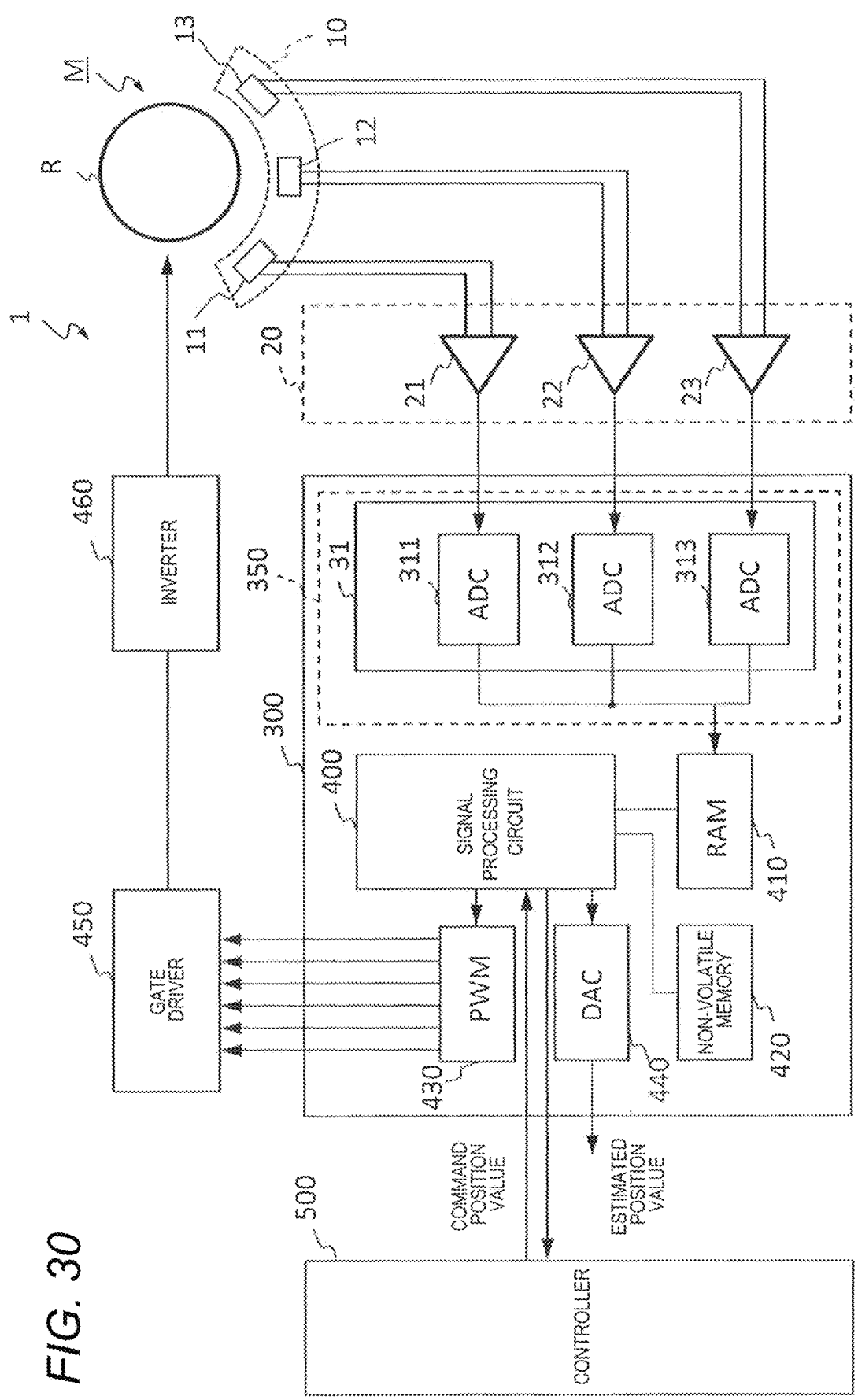

FIG. 30 is a schematic diagram showing an exemplary construction of the motor controlling system 1 according to the present embodiment. As shown in FIG. 30, the motor controlling system 1 according to the present embodiment includes a motor M, a detection section 10, an amplification section 20, a position estimation device 300, a gate driver 450, an inverter 460, and a controller 500.

The detection section 10 includes N (where N is an integer of 3 or more) sensors that detect magnetic fields which are created by a plurality of magnetic poles possessed by the rotor R, the N sensors each outputting a detection signal having a magnitude which is in accordance with an intensity of a detected magnetic field. The N sensors are disposed so that the N detection signals are displaced in phase by an angle which is 360 degrees/N. In the example shown in the figure, N is 3, and the detection section 10 includes sensors 11, 12 and 13. The construction and operation of the motor M, the detection section 10, and the amplification section 20 in the present embodiment have been as described with respect to the other embodiments, and their detailed description will not be repeated here.

The position estimation device 300 according to the present embodiment includes a preprocessing circuit 350 which generates N corrected detection signals from the N detection signals, and a signal processing circuit 400 which generates and outputs a signal indicating an estimated position value of the mover based on the N corrected detection signals.

The signal processing circuit 400 according to the present embodiment may be an integrated circuit (IC) chip such as a central processing unit (CPU) or a digital signal processor. The position estimation device 300 includes a storage medium having stored thereon a computer program to control an operation of the signal processing circuit 400. This storage medium, which may be a non-volatile memory 420 such as a flash ROM, is connected to the signal processing circuit 400.

In the present embodiment, the N corrected detection signals which are output from the preprocessing circuit 350 are stored as variables to the RAM 410 in a timely manner.

The preprocessing circuit 350 includes the aforementioned AD conversion section 31, and may optionally include the correction section 3244 (FIG. 27). By the preprocessing circuit 350, detection signals are converted into digital signals and are subjected to various correction processes. Herein, those detection signals which have been subjected to such preprocessing will be referred to as "corrected detection signals".

In accordance with instructions in the computer program, the signal processing circuit 400 performs the following steps.

First, the signal processing circuit 400 reads the corrected detection signals from the RAM 410. Next, a crossing at which two signals among the N corrected detection signals cross each other is sequentially detected.

The signal processing circuit 400 subdivides a corrected detection signal that links from a crossing to another crossing which is adjacent to that crossing into one or more segments, and detects each segment as a subdivision signal.

The signal processing circuit 400 reads measurement data in which a moved amount of the mover corresponding to each segment is associated with every segment, from a storage device. This storage device may be the storage medium in which the aforementioned computer program is stored, or another storage device such as a memory card. In the present embodiment, measurement data is retained in the non-volatile memory 420, and is read from the non-volatile memory 420. As described above, this measurement data is acquired via offline processing prior to shipment, and is retained in the storage medium. After shipment, the measurement data may be updated.

By referring to this measurement data, the signal processing circuit 400 identifies a segment that corresponds to a current position of the rotor R, based on the relationship among the N corrected detection signals and on the subdivision signals.

As described earlier, in one implementation, given an integer i which is 1 or greater, an integer n which defines a current point in time, an ordinal number i of the identified segment, a position Θoffset[i] of the rotor R at a start point of the identified segment, a difference X[n] between a value of a subdivision signal at the start point of the segment and a current value of the subdivision signal, an estimated position value Θ[n] of the rotor R, and a factor of proportionality k[i], the relationship Θ[n]=Θoffset[i]+k[i]×X[n] holds true. The estimated position value of the rotor R is determined from this relationship.

The signal indicating the estimated position value of the rotor R has a value which linearly increases in proportion to a moved amount of the rotor R from the reference position. In a preferable implementation, the signal indicating the estimated position value of the rotor R has a digital value or an analog value which is in proportion to Θ.

Thus, based on the identified segment, the signal processing circuit 400 determines an estimated position value of the mover from the levels of the subdivision signals, and outputs a signal indicating an estimated position value. The estimated position signal may be input to a feedback (F/B) terminal of the controller 500 in the form of a digital value. The estimated position signal may be output to the exterior as serial data, or converted by a DA conversion circuit (DAC) 440 into an analog value and then output. For example, during maintenance, the signal which has been converted into an analog value may be observed with an oscilloscope, whereby a comparison between a command position value and the estimated position value would be possible.

The position estimation device 300 may include a circuit (FIG. 28) which outputs the aforementioned Z-phase signal in pulse form in response to an instruction from the signal processing circuit 400. The functional blocks shown in FIG. 28 may also be implemented by the signal processing circuit 400.

The program may be arranged so that the preprocessing circuit 350 in the signal processing circuit 400 performs a correction step that is selected from among the aforementioned first correction step, second correction step, and third correction step to generate a corrected detection signal. When the signal processing circuit 400 operates in accordance with such a program, the first correction step consecutively selects one of the detection signals, and subtracts a mean value of the other unselected detection signals from the selected detection signal, thereby correcting the selected detection signal to generate a corrected detection signal. The second correction step involves: for a detection signal of each phase, detecting a local maximum and a local minimum for a respective pole pair and a maximum amplitude value and a minimum amplitude value per cycle of electrical angle, over the course of at least two cycles; for a detection signal of each phase, calculating in the correction section a mean of the maximum amplitude values and a mean of the minimum amplitude values; determining an offset correction value to be a maximum-minimum mean value which is calculated from the mean of the maximum amplitude values and the mean of the minimum amplitude values; for each detection signal, calculating a positive gain correction value for a respective magnetic pole pair that equates the local maximum with a predetermined maximum value; for the detection signal of each phase, calculating a negative gain correction value for a respective magnetic pole pair that equates the local minimum with a predetermined minimum value; and for the detection signal of each phase, adding the offset correction value, multiplying a positive signal value from a respective magnetic pole pair with the positive gain correction value, and multiplying a negative signal value from a respective magnetic pole pair with the negative gain correction value. The third correction step involves multiplying each detection signal with a predetermined coefficient based on a waveform state of the detection signal.

Among the operations to be executed by the signal processing circuit 400, the following are in no way indispensable operations to the present invention: reading, from a storage device, measurement data in which a moved amount of the mover corresponding to each segment is associated with every segment; and identifying a segment that corresponds to a current position of the mover by referring to the measurement data and based on the relationship among the N corrected detection signals and on the subdivision signals. Instead of executing these operations, the signal processing circuit 400 may sequentially join the subdivision signals, and based on the plural subdivision signals having been joined, determine an estimated position value of the mover from levels of the subdivision signals, and output a signal indicating the estimated position value.

In addition to executing the aforementioned position estimation process, the signal processing circuit 400 may be programmed to perform calculations which are necessary for motor driving. The various processes to be executed by the signal processing circuit 400 do not need to be executed by a single IC chip. Some or all of the functions to be performed by the position estimation section 30, 30A, or 30B and the control section 50 according to the first to sixth embodiments may be realized through digital signal processing. Therefore, the different processes to be executed by the respective functional blocks of the position estimation section 30, 30A, or 30B may be split among a plurality of processing units or digital signal processors (DSP). Moreover, the signal processing circuit 400 according to the present embodiment may be implemented by using a programmable logic device such as an FPGA (Field-Programmable Gate Array).

In the present embodiment, based on an estimated position value of the rotor R, the signal processing circuit 400 calculates a command voltage value which is necessary for motor control, and supplies it to the pulse width modulation (PWM) circuit 430. Based on this command voltage value, the pulse width modulation circuit 430 supplies a PWM signal to the gate driver 450. Based on the PWM signal, the gate driver 450 opens or closes switching transistors in the inverter 460 so as to supply a necessary voltage and electric current to the motor M.

In acquiring or updating measurement data when offline, the signal processing circuit 400, the rotor R moves (rotate) at a constant velocity in accordance with an instruction in the computer program. Then, it measures a moving (rotating) time of the rotor R for each segment, and generates data in which a moved amount (mechanical angle) of the rotor R corresponding to each segment is associated with every segment. The signal processing circuit 400 causes this data to be stored to the non-volatile memory 420 as measurement data.

When the system includes a temperature detection element, a temperature at the time of acquiring measurement data can be stored to the storage device as a reference temperature. As has been described with respect to the sixth embodiment, when the detection signal changes in amplitude depending on the ambient temperature, the reference temperature may be read from the storage device, and a detection signal may be corrected based on the current temperature as acquired from the temperature detection element and on the reference temperature.

REFERENCE SIGNS LIST 1, 1A, 1B, 1C . . . motor controlling system, 10 . . . detection section, 11, 12, 13 . . . sensor, 20 . . . amplification section, 21, 22, 23 . . . differential amplifier, 30, 30A, 30B . . . position estimation section, 31 . . . AD conversion section, 311, 312, 313 . . . AD conversion circuit, 321 . . . crossing detection section, 322 . . . subdivision detection section, 323 . . . line segment joining section, 324 . . . correction section, 3241 . . . first correction section, 3242 . . . second correction section, 3243 . . . third correction section, 325 . . . normalization section, 33, 33A, 33B . . . storage section, 40 . . . subtracter, 50 . . . control section, 60 . . . driving section, M . . . motor

The invention claimed is:

1. A signal processing device, comprising:
a preprocessing circuit to generate N corrected detection signals from N detection signals, the N detection signals being output from sensors that are disposed so that the N detection signals are displaced in phase by an angle which is 360 degrees/N;
a signal processing circuit to generate and output a line segment joining signal to form a line, based on the N corrected detection signals; and a storage medium being connected to the signal processing circuit and having stored thereon a computer program to control an operation of the signal processing circuit, wherein, in accordance with instructions in the computer program, the signal processing circuit performs:

sequentially detecting a crossing at which two signals among the N corrected detection signals cross each other;

subdividing a corrected detection signal that links from a crossing to another crossing which is adjacent to that crossing into one or more segments, and detecting each segment as a subdivision signal;

reading, from a storage device, measurement data in which a value corresponding to each segment is associated with every segment; and by referring to the measurement data, identifying a segment, based on a relationship among the N corrected detection signals that are defined by the line segment joining signal and on the subdivision signals.

2. The signal processing device of claim 1, wherein,
in accordance with an instruction in the computer program, the signal processing circuit
measures a moving time of a mover for each segment while the mover is moving at a constant velocity, generates data in which a moved amount of the mover corresponding to each segment is associated with every segment, and causes the data to be stored to the storage device as the measurement data.

3. The signal processing device of claim 1, wherein the value is linearly increased in proportion to a moved amount of a mover from a reference position.

4. The signal processing device of claim 1, wherein,
the preprocessing circuit performs a correction step selected from among a first correction step, a second correction step, and a third correction step to generate the corrected detection signals;
the first correction step comprises
consecutively selecting one of the detection signals, and subtracting a mean value of the other unselected detection signals from the selected detection signal, thereby correcting the selected detection signal to generate the corrected detection signal;
the second correction step comprises,
for the detection signal of each phase, detecting a local maximum and a local minimum for a respective pole pair and a maximum amplitude value and a minimum amplitude value per cycle of electrical angle, over the course of at least two cycles,
for the detection signal of each phase, calculating in the correction section a mean of the maximum amplitude values and a mean of the minimum amplitude values,
determining an offset correction value to be a maximum-minimum mean value which is calculated from the mean of the maximum amplitude values and the mean of the minimum amplitude values,
for each detection signal, calculating a positive gain correction value for a respective magnetic pole pair that equates the local maximum with a predetermined maximum value,
for the detection signal of each phase, calculating a negative gain correction value for a respective magnetic pole pair that equates the local minimum with a predetermined minimum value, and
for the detection signal of each phase, adding the offset correction value, multiplying a positive signal value from a respective magnetic pole pair with the positive gain correction value, and multiplying a negative signal value from a respective magnetic pole pair with the negative gain correction value; and
the third correction step comprises
multiplying each detection signal with a predetermined coefficient based on a waveform state of the detection signal.

5. A method for signal processing comprising:
a signal detection step in which N (where N is an integer of 3 or more) sensors each detect a magnetic field which is in accordance with a position of a mover and output a detection signal as an electrical signal, the detection signals being displaced in phase by an angle obtained by dividing 360 degrees by N;
a first correction step in which a correction section consecutively selects one of the detection signals at each control cycle for detecting the magnetic field, and subtracts a mean value of the other unselected detection signals from the selected detection signal, thereby generating, for each detection signal, a detection signal into which the selected detection signal has been corrected.

6. The method for signal processing of claim 5, wherein,
in the signal detection step,
the number N of sensors is three, such that three said detection signals are displaced in phase by 120 degrees.

7. The method for signal processing of claim 6, wherein,
in the first correction step, corrected detection signals are generated by using equations (1) through (3) comprising:

$$Hiu0'=Hu0'-(Hv0'+Hw0')/2 \quad (1),$$

$$Hiv0'=Hv0'-(Hu0'+Hw0')/2 \quad (2), \text{ and}$$

$$Hiw0'=Hw0'-(Hu0'+Hv0')/2 \quad (3),$$

where Hiu0', Hiv0' and Hiw0' are values for the corrected detection signals, and, Hu0', Hv0' and Hw0' are values for the detection signals.

8. The method for signal processing, comprising:
a signal detection step in which N (where N is an integer of 3 or more) sensors each detect a magnetic field which is in accordance with a position of a mover and output a detection signal as an electrical signal, the detection signals being displaced in phase by an angle obtained by dividing 360 degrees by N;
a local maximum/local minimum detection step in which, for the detection signal of each phase, a correction section detects a local maximum and a local minimum for a respective pole pair and a maximum amplitude value and a minimum amplitude value per cycle of electrical angle, over the course of at least two cycles;
a mean calculation step in which, for the detection signal of each phase, the correction section calculates a mean of the maximum amplitude values and a mean of the minimum amplitude values;
an offset calculation step in which the correction section determines an offset correction value to be a maximum-minimum mean value which is calculated from the mean of the maximum amplitude values and the mean of the minimum amplitude values;
a first gain calculation step in which, for each detection signal, the correction section calculates a positive gain correction value for a respective magnetic pole pair that equates the local maximum with a predetermined maximum value;

a second gain calculation step in which, for the detection signal of each phase, the correction section calculates a negative gain correction value for a respective magnetic pole pair that equates the local minimum with a predetermined minimum value; and a correction step in which, for the detection signal of each phase, the correction section adds the offset correction value, multiplies a positive signal value from a respective magnetic pole pair with the positive gain correction value, and multiplies a negative signal value from a respective magnetic pole pair with the negative gain correction value.

9. The method for signal processing of claim 8, comprising:

a crossing detection step to sequentially detect a crossing at which each detection signal having been output through the signal detection step crosses another;

a subdivision detection step to detect a portion of the detection signal that connects from the crossing to another crossing which is adjacent to that crossing, as one or more subdivision signals; and a line segment joining step to sequentially join the subdivision signals and estimates the position of the mover based on the plural subdivision signals having been joined, to generate an estimated position value signal.

10. The method for signal processing of claim 9, wherein, in the crossing detection step, between the crossing and the other crossing which is adjacent to that crossing, a zero-crossing at which a potential of the detection signal crosses a reference voltage from the crossing is sequentially detected; and in the subdivision detection step, at least a portion of the detection signal from the crossing to the zero-crossing that is adjacent to that crossing is detected as a first subdivision signal, and a portion of the detection signal from the zero-crossing to the other crossing is detected, as a second subdivision signal.

* * * * *